United States Patent
Gurbani et al.

(10) Patent No.: US 12,462,810 B2
(45) Date of Patent: Nov. 4, 2025

(54) SYSTEM AND METHOD USING MACHINE LEARNED VOICEPRINT SETS FOR EFFICIENT DETERMINATION OF VOICE MEMBERSHIP USING ENHANCED SCORE NORMALIZATION AND LOCALITY SENSITIVE HASHING

(71) Applicant: Vail Systems, Inc., Deerfield, IL (US)

(72) Inventors: Vijay K. Gurbani, Lisle, IL (US); Yu Zhou, Naperville, IL (US); Bopsi Chandramouli, Palatine, IL (US)

(73) Assignee: VAIL SYSTEMS, INC., Deerfield, IL (US)

( * ) Notice: Subject to any disclaimer, the term of this patent is extended or adjusted under 35 U.S.C. 154(b) by 280 days.

(21) Appl. No.: 18/323,576

(22) Filed: May 25, 2023

(65) Prior Publication Data
US 2023/0386476 A1    Nov. 30, 2023

Related U.S. Application Data

(60) Provisional application No. 63/365,344, filed on May 26, 2022.

(51) Int. Cl.
*G10L 17/12*   (2013.01)
*G10L 17/02*   (2013.01)
*G10L 25/30*   (2013.01)

(52) U.S. Cl.
CPC .............. *G10L 17/12* (2013.01); *G10L 17/02* (2013.01); *G10L 25/30* (2013.01)

(58) Field of Classification Search
CPC ......... G10L 17/12; G10L 17/02; G10L 25/30; G10L 17/18
See application file for complete search history.

(56) References Cited

U.S. PATENT DOCUMENTS 11,468,901 B2 *   10/2022   Khoury .................... G10L 17/08
12,015,637 B2 *   6/2024   Lakhdhar ............... G06N 3/045
(Continued)

OTHER PUBLICATIONS

C. S. Greenberg, L. P. Mason, S. O. Sadjadi, and D. A. Reynolds, "Two decades of speaker recognition evaluation at the national institute of standards and technology," Computer Speech & Language, vol. 60, p. 101032, 2020. [Online]. Available: https://www.sciencedirect.com/science/article/pii/S0885230819302761.
(Continued)

*Primary Examiner* — Michael N Opsasnick
(74) *Attorney, Agent, or Firm* — ICE MILLER LLP; Safet Metjahic

(57) ABSTRACT

A system and method for identifying a speaker based on dual calculation of voiceprint match scores, using machine learned voiceprint sets and machine learned hashing models to reduce a voiceprint set, normalizing the joint scores, and performing user identification. The system and method include, among other things, a novel normalization technique designed for multitarget detection that considers scores between all enrolled negative list (NL) utterances and the normalization cohort as a single distribution. The system and method include machine learned hashing models to efficiently find a small subset of utterances from enrolled NL utterances and the normalization cohort that are most similar to the test utterance, so that the number of similarity score computations can be significantly reduced in identifying the speaker.

20 Claims, 7 Drawing Sheets

(56) References Cited

U.S. PATENT DOCUMENTS

| | | | | | |
|---|---|---|---|---|---|
| 2015/0127342 | A1* | 5/2015 | Sharifi | ............... | G10L 17/18 704/239 |
| 2015/0347734 | A1* | 12/2015 | Beigi | ............... | H04L 9/3268 726/28 |
| 2021/0326421 | A1* | 10/2021 | Khoury | ............... | G10L 17/08 |
| 2022/0182485 | A1* | 6/2022 | Frenkel | ............ | H04M 3/2281 |

OTHER PUBLICATIONS

S. O. Sadjadi, C. Greenberg, E. Singer, D. Reynolds, L. Mason, and J. Hernandez-Cordero, "The 2019 NIST Speaker Recognition Evaluation CTS Challenge," in Proc. The Speaker and Language Recognition Workshop (Odyssey 2020), 2020, pp. 266-272.

E. Singer and D. A. Reynolds, "Analysis of multitarget detection for speaker and language recognition," in Proc. The Speaker and Language Recognition Workshop (Odyssey 2004), 2004, pp. 301-308.

Y. Zigel and M. Wasserblat, "How to deal with multiple-targets in speaker identification systems?" in 2006 IEEE Odyssey—The Speaker and Language Recognition Workshop, 2006, pp. 1-7.

A. Malegaonkar and A. Ariyaeeinia, "Performance evaluation in openset speaker identification," in Biometrics and ID Management, C. Vielhauer, J. Dittmann, A. Drygajlo, N. C. Juul, and M. C. Fairhurst, Eds. Berlin, Heidelberg: Springer Berlin Heidelberg, 2011, pp. 106-112.

N. Gunson, D. Marshall, and M. Jack, "Effective speaker spotting for watch-list detection of fraudsters in telephone banking," IET Biometrics, vol. 4, No. 2, pp. 127-136, 2015. [Online]. Available: https://ietresearch.onlinelibrary.wiley.com/doi/abs/10.1049/ietbmt. 2013.0060.

S. Shon, N. Dehak, D. Reynolds, and J. Glass, "MCE 2018: The 1st Multi-Target Speaker Detection and Identification Challenge Evaluation," in Proc. Interspeech 2019, 2019, pp. 356-360.

D. A. Reynolds, T. F. Quatieri, and R. B. Dunn, "Speaker verification using adapted gaussian mixture models," Digital Signal Processing, vol. 10, No. 1, pp. 19-41, 2000. [Online]. Available: https://www.sciencedirect.com/science/article/pii/S1051200499903615.

N. Dehak, P. J. Kenny, R. Dehak, P. Dumouchel, and P. Ouellet, "Frontend factor analysis for speaker verification," IEEE Transactions on Audio, Speech, and Language Processing, vol. 19, No. 4, pp. 788-798, 2011.

D. Snyder, D. Garcia-Romero, G. Sell, D. Povey, and S. Khudanpur, "Xvectors: Robust dnn embeddings for speaker recognition," in 2018 IEEE International Conference on Acoustics, Speech and Signal Processing (ICASSP), 2018, pp. 5329-5333.

S. J. Prince and J. H. Elder, "Probabilistic linear discriminant analysis for inferences about identity," in 2007 IEEE 11th International Conference on Computer Vision, 2007, pp. 1-8.

J. Fortuna, P. Sivakumaran, A. M. Ariyaeeinia, and A. Malegaonkar, "Relative effectiveness of score normalisation methods in open-set speaker identification," in Proc. The Speaker and Language Recognition Workshop (Odyssey 2004), 2004, pp. 369-376.

J. Fortuna, P. Sivakumaran, A. Ariyaeeinia, and A. Malegaonkar, "Openset speaker identification using adapted Gaussian mixture models," in Proc. Interspeech 2005, 2005, pp. 1997-2000.

P. Matejka, O. Novotn'y, O. Plchot, L. Burget, M. D. S'anchez, and J. C ernocky', "Analysis of Score Normalization in Multilingual Speaker Recognition," in Proc. Interspeech 2017, 2017, pp. 1567-1571.

P. Indyk and R. Motwani, "Approximate nearest neighbors: Towards removing the curse of dimensionality," in Proceedings of the Thirtieth Annual ACM Symposium on Theory of Computing, ser. STOC '98. New York, NY, USA: Association for Computing Machinery, 1998, p. 604-613. [Online]. Available: https://doi.org/10.1145/276698.276876.

K. Li and J. Porter, "Normalizations and selection of speech segments for speaker recognition scoring," in ICASSP-88., International Conference on Acoustics, Speech, and Signal Processing. Los Alamitos, CA, USA: IEEE Computer Society, Apr. 1988, pp. 595,596,597,598. [Online]. Available: https://doi.ieeecomputersociety.org/10.1109/ICASSP.1988.196655.

R. Auckenthaler, M. Carey, and H. Lloyd-Thomas, "Score normalization for text-independent speaker verification systems," Digital Signal Processing, vol. 10, No. 1, pp. 42-54, 2000. [Online]. Available: https://www.sciencedirect.com/science/article/pii/S1051200499903603.

Z. Karam, W. Campbell, and N. Dehak, "Towards reduced false alarms using cohorts," in Acoustics, Speech, and Signal Processing, 1988. ICASSP-88., 1988 International Conference on, May 2011, pp. 4512-4515.

S. Cumani, P. Batzu, D. Colibro, C. Vair, P. Laface, and V. Vasilakakis, "Comparison of speaker recognition approaches for real applications." in Proceedings of the Annual Conference of the International Speech Communication Association, Interspeech, Aug. 2011, pp. 2365-2368.

E. Khoury, K. Lakhdhar, A. Vaughan, G. Sivaraman, and P. Nagarsheth, "Pindrop Labs' Submission to the First Multi-Target Speaker Detection and Identification Challenge," in Proc. Interspeech 2019, 2019, pp. 1502-1505.

R. Font, "A denoising autoencoder for speaker recognition. results on the mce 2018 challenge," in ICASSP 2019—2019 IEEE International Conference on Acoustics, Speech and Signal Processing (ICASSP), 2019, pp. 6016-6020.

K. Wilkinghoff, "On Open-Set Speaker Identification with I-Vectors," in Proc. The Speaker and Language Recognition Workshop (Odyssey 2020), 2020, pp. 408-414.

P. Matejka, O. Glembek, F. Castaldo, M. J. Alam, O. Plchot, P. Kenny, L. Burget, and J. Cernock'y, "Full-covariance ubm and heavy-tailed plda in i-vector speaker verification," in ICASSP, IEEE International Conference on Acoustics, Speech and Signal Processing—Proceedings, May 2011, pp. 4828-4831.

M. S. Charikar, "Similarity estimation techniques from rounding algorithms," in Proceedings of the Thiry-Fourth Annual ACM Symposium on Theory of Computing, ser. STOC '02. New York, NY, USA: Association for Computing Machinery, 2002, p. 380-388. [Online]. Available: https://doi.org/10.1145/509907.509965.

L. Schmidt, M. Sharifi, and I. L. Moreno, "Large-scale speaker identification," in 2014 IEEE International Conference on Acoustics, Speech and Signal Processing (ICASSP), 2014, pp. 1650-1654.

P. Kenny, "Bayesian Speaker Verification with Heavy-Tailed Priors," in Proc. The Speaker and Language Recognition Workshop (Odyssey 2010), 2010, p. paper 14.

J. Ma, J. Silovsky, M.-h. Siu, and O. Kimball, "Large-scale speaker search using plda on mismatched conditions," in 2015 IEEE International Conference on Acoustics, Speech and Signal Processing (ICASSP), 2015, pp. 1846-1850.

W. Jeon and Y.-M. Cheng, "Efficient speaker search over large populations using kernelized locality-sensitive hashing," in 2012 IEEE International Conference on Acoustics, Speech and Signal Processing (ICASSP), 2012, pp. 4261-4264.

R. Leary and W. Andrews, "Random projections for large-scale speaker search," in Proc. Interspeech 2014, 2014, pp. 66-70.

S. Shon, Y. Lee, and T. Kim, "Large-scale speaker retrieval on random speaker variability subspace," arXiv preprint arXiv:1811. 10812, 2018.

D. Povey, A. Ghoshal, G. Boulianne, L. Burget, O. Glembek, N. Goel, M. Hannemann, P. Motl'icek, Y. Qian, P. Schwarz, J. Silovsk'y, G. Stemmer, and K. Vesel, "The kaldi speech recognition toolkit," IEEE 2011 Workshop on Automatic Speech Recognition and Understanding, Jan. 2011.

* cited by examiner

Methodology Flow: LSH and NL-Norm

Data: $t$: Test vector to be matched in $\mathcal{E}$
Data: $T$: Threshold for NL detection
Data: $L, K_t, K_e$: LSH depth and adaptive lengths, selected using Validation set (Sec. V)
Data: $C$: The normalization cohort
Data: $\mathcal{E}$: The negative list 1. $initialized \leftarrow False$;
2. if $(!initialized)$ then
3.     $initialized \leftarrow True$;
4.     $S_{NL}^{(K_e)} \leftarrow \emptyset$;
5.     for $(e \in \mathcal{E})$ do
6.        $S_e \leftarrow \emptyset$;
7.        for $(c \in C)$ do
8.           $S_e \leftarrow S_e \cup score(e, c)$;
9.        end
10.        $S_{NL}^{(K_e)} \leftarrow S_{NL}^{(K_e)} \cup top\_n(S_e, K_e)$ /* Eq. 10 */
11.     end
12. $return\ NL\_norm(\mathcal{E}, C, S_{NL}^{(K_e)}, t, L, K_t, T)$
13. function $boolean\ NL\_norm(\mathcal{E}: list, C: list, S_{NL}^{(K_e)}: list, t: vector, L: int, K_t: int, T: float)$:
14.     $t\_\mathcal{E}\_set \leftarrow LSH\_lookup(t, \mathcal{E}, L)$;
15.     $t\_C\_set \leftarrow LSH\_lookup(t, C, K_t)$;
16.     $S_t^{(K_t)} \leftarrow \emptyset$;
17.     for $(q \in t\_C\_set)$ do
18.        $S_t^{(K_t)} \leftarrow S_t^{(K_t)} \cup score(t, q)$ /* Eq. 4 */
19.     end
20.     $result\_set \leftarrow \emptyset$;
21.     for $(e \in t\_\mathcal{E}\_set)$ do
22.        $s \leftarrow score(e, t)$;
23.        $s_{nL\_norm} \leftarrow \frac{1}{2} \left( \frac{s - \mu(S_{NL}^{(K_e)})}{\sigma(S_{NL}^{(K_e)})} + \frac{s - \mu(S_t^{(K_t)})}{\sigma(S_t^{(K_t)})} \right)$ /* Eq. 12 */
24.        $result\_set \leftarrow results\_set \cup \{s_{nL\_norm}\}$;
25.     end
26.     $return\ max(result\_set) > T$? $True : False$;

FIG. 7

SYSTEM AND METHOD USING MACHINE LEARNED VOICEPRINT SETS FOR EFFICIENT DETERMINATION OF VOICE MEMBERSHIP USING ENHANCED SCORE NORMALIZATION AND LOCALITY SENSITIVE HASHING

CROSS-REFERENCE TO RELATED APPLICATION

This application claims priority to and the benefit of provisional U.S. Patent Application No. 63/365,344, filed May 26, 2022, which is hereby incorporated herein by reference in its entirety.

FIELD OF THE DISCLOSURE

The present disclosure relates to a method, a system, and a computer program for analysis of a speech signal and low latency detection and accurate recognition of a speaker in a list of known speakers. The present disclosure further relates to a method, a system, and a computer program for fraud detection.

BACKGROUND OF THE DISCLOSURE

Negative list (NL) detection, commonly referred to as open-set or multi-target speaker detection, attempts to match a test utterance with any one of a set of known utterances enrolled in the negative list. A number of normalization techniques have been developed that use a normalization cohort for similarity score calibration in order to increase the detection accuracy. Such normalization techniques can be used to mitigate statistical variations in similarity scores that form the basis for identity inference in, for example, biometric verification systems. The variations can be caused by so-called miss-matched conditions, in which the enrollment and probe samples were acquired.

An unfulfilled need exists for a method, a system, and a computer program for analysis of a speech signal and accurate low latency detection and recognition of a speaker.

SUMMARY OF THE DISCLOSURE

The disclosure provides a novel and non-obvious method, system, and computer program that can analyze a speech signal and accurately, and with low latency, detect and recognize a speaker.

A computer-implemented method is provided for recognizing a user of a communicating device as belonging to a list of known users from an utterance included in a voice signal received from the communicating device. The method comprises: applying an utterance of a speaker to a machine learning voiceprint extraction model to extract a voiceprint set comprising an i-vector or a speaker embedding based on the utterance; outputting the voiceprint set by the machine learning voiceprint extraction model; applying the output voiceprint set to a machine learning model to compute an utterance match score based on the voiceprint set, or to a machine learning hashing model to reduce the voiceprint set to a reduced dimension voiceprint set and apply the reduced dimension voiceprint set to the machine learning model to compute the utterance match score based on the reduced dimension voiceprint set; outputting the utterance match score by the machine learning model; applying the output match score to a machine learning score normalization model (NL-NORM) to calibrate the match score; comparing the calibrated match score to a match score threshold; and, when the calibrated match score is greater than the match score threshold, identifying the user as belonging to a list of known users.

An apparatus is provided for recognizing a user of a communicating device as belonging to a list of known users from an utterance included in a voice signal received from the communicating device. The apparatus comprises one or more processors, an input device, an output device, and a memory storing one or more programs to be executed by the one or more processors. The one or more programs comprise instructions for: applying an utterance of a speaker to a machine learning voiceprint extraction model to extract a voiceprint set comprising an i-vector or a speaker embedding based on the utterance; outputting the voiceprint set by the machine learning voiceprint extraction model; applying the output voiceprint set to a machine learning model to compute an utterance match score based on the voiceprint set, or to a machine learning hashing model to reduce the voiceprint set to a reduced dimension voiceprint set and apply the reduced dimension voiceprint set to the machine learning model to compute the utterance match score based on the reduced dimension voiceprint set; outputting the utterance match score by the machine learning model; applying the output match score to a machine learning score normalization model (NL-NORM) to calibrate the match score; comparing the calibrated match score to a match score threshold; and, when the calibrated match score is greater than the match score threshold, identifying the user as belonging to a list of known users.

A non-transitory computer readable storage medium is provided for storing one or more programs, the one or more programs comprising instructions, which, when executed by an apparatus device with one or more processors, one or more input devices, and one or more output devices, cause the apparatus to perform operations for recognizing a user of a communicating device as belonging to a list of known users from an utterance included in a voice signal received from the communicating device, the operations comprising: applying an utterance of a speaker to a machine learning voiceprint extraction model to extract a voiceprint set comprising an i-vector or a speaker embedding based on the utterance; outputting the voiceprint set by the machine learning voiceprint extraction model; applying the output voiceprint set to a machine learning model to compute an utterance match score based on the voiceprint set, or to a machine learning hashing model to reduce the voiceprint set to a reduced dimension voiceprint set and apply the reduced dimension voiceprint set to the machine learning model to compute the utterance match score based on the reduced dimension voiceprint set; outputting the utterance match score by the machine learning model; applying the output match score to a machine learning score normalization model (NL-NORM) to calibrate the match score; comparing the calibrated match score to a match score threshold; and, when the calibrated match score is greater than the match score threshold, identifying the user as belonging to a list of known users.

The machine learning vector extraction model can comprise a Gaussian Mixture Model (GMM) or a Gaussian Mixture Model with Universal Background Model (GMM-UBM) that extracts the i-vector.

The machine learning voiceprint extraction model can comprise a Deep Neural Network model (DNN) that extracts the speaker embedding.

The DNN can comprise a Convolutional Neural Network (CNN), a Residual Network (ResNet), a Time Delay Neural Network (TDNN), or a machine learning model architecture configured for speaker recognition.

The machine learning hashing model can comprise a Locality Sensing Hashing model (LSH).

The machine learning hashing model can be configured to find a subset of negative list speakers and a subset of a normalization cohort that are most similar to the utterance, such that a similarity score is evaluated between the utterance and the subset of negative list speakers and the subset of the normalization cohort to reduce computation by a processor at inference time.

The machine learning score normalization model (NL-NORM) can be configured to analyze similarity scores between a normalization cohort and all enrolled negative list speakers as a single distribution to calibrate the match score.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

FIG. 7 illustrates an example of a methodology flow that can be performed by the VRFR system.

Figure 1:
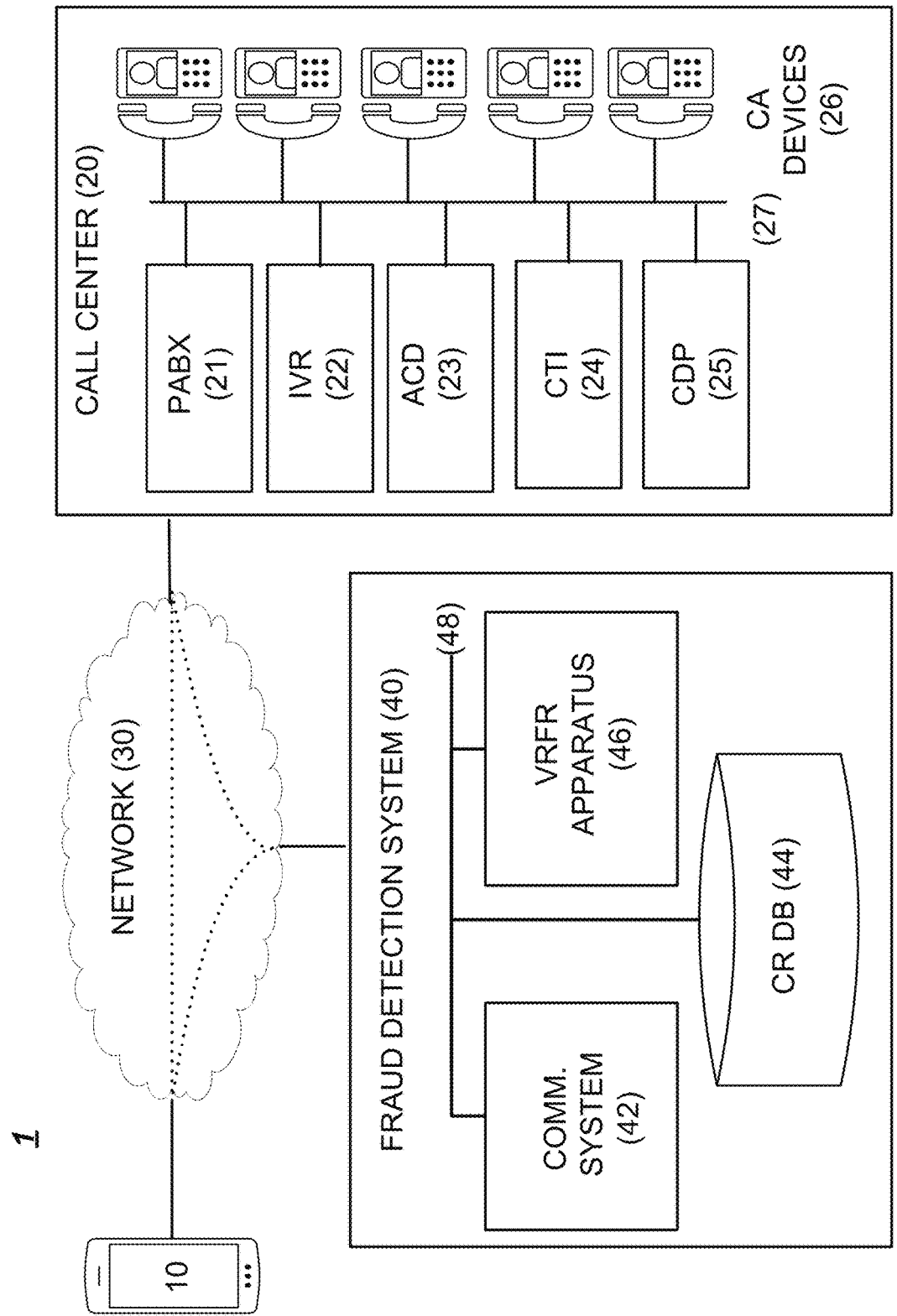
FIG. 1 illustrates an example of a communication system, constructed according to the principles of the disclosure.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Caller fraud, including, for example, call center fraud, bank fraud, or other types of fraud, has been growing at an alarming rate over recent years. There are many reasons for this growth. Some of the main reasons for this growth include the increased use of web and mobile applications, and the introduction of chip cards by the credit card industry, thereby causing fraudsters to seek easier opportunities elsewhere. The telecom field is one such area, which has historically had much weaker security awareness and defenses.

The deregulation of the telecom industry coupled with the rise of voice-over-Internet-Protocol (VoIP) has exposed the drawbacks of processes that worked well for the traditional telephony network but do not for VoIP networks. This includes the ability to spoof caller identifications (IDs), launch large-scale attacks through automated telephony applications, and to fake personal identities through various means.

The traditional authentication method used, for example, by call center agents, is one of knowledge-based-authentication (KBA), which relies on, for example, a call center agent asking the caller to answer questions to which they alone would know the answers. However, the easy availability of personal information through Internet search engines, data breaches in government and corporate networks, and various social media websites, has given fraudsters the ability to gather a wide variety of data, thereby providing them with the ability to convince call recipients that they indeed are who they are pretending to be. For instance, call center agents being in the role of assisting their customers are particularly vulnerable to the social engineering practices used by fraudsters. All these factors have contributed to a steady and steep increase in caller fraud.

Many existing fraud detection systems use a fraudster database (also referred to as a fraud database) containing fraudster profiles. Whenever a new call is processed, a fraudster database is referenced (or looked up) to verify if a match can be found in the database for the current caller. The lookup may be based on a variety of approaches, such as, for example, a voice print or a phone print, but the overall approach has remained relatively constant in involving the lookup against a fraudster database.

Further, state of the art fraud detection technologies typically suffer from prohibitively costly implementation and high latency, for example, due to the time it takes to find a voiceprint of a fraudster in a call center application. The state of the art in call fraud detection is dominated mainly by two issues: the size of the list containing the fraudster voiceprints (known as the negative list, or NL); and, the scoring function used to match the target voiceprint to the list of fraudster voiceprints. For the latter issue, the Probabilistic Linear Discrimination Analysis (PLDA) generative model is considered by many to be the best scoring function, leading to a low error rate; but its disadvantage is that it is computationally intensive and expensive.

As the size of the NL grows larger, it takes more time to find a target match. In various fraud detection applications, the detection time it takes to provide real-time, or near real-time indication to a call center about a fraudster match is of importance and must be bounded. This disclosure provides systems and methodologies for bounding detection time, in many instances resulting in significant reduction in detection time, while also providing improved accuracy. Compared to state of the art, the systems and methodologies provided by this disclosure result in significant reduction in detection time, while applying the computationally expensive PLDA algorithm for scoring. The systems and methodologies of this disclosure also provide more accurate detection of fraudsters compared to state of the art solutions.

Negative list detection, commonly referred as open-set or multi-target speaker detection, attempts to match an utterance with any one of a set of known utterances enrolled in the negative list. A number of normalization techniques, such as, for example, Z-Norm, T-Norm and AS-Norm, have been developed that use a normalization cohort for similarity score calibration in order to increase the detection accuracy. While these normalization methods apply to both single-target verification and multi-target detection, the instant disclosure provides a novel NL normalization methodology (NL-Norm normalization) that is designed specifically for multitarget detection by considering scores between all enrolled NL utterances and the normalization cohort as a single distribution.

The disclosure provides novel systems and methods that overcome the disadvantages discussed above, and that satisfy an unmet need for accurately, effectively and efficiently detecting a fraudster. In various embodiments, the disclosure provides Locality Sensitive Hashing (LSH), which can be applied, for example, with the NL-Norm normalization methodology, to efficiently find a small subset of utterances from enrolled NL utterances and the normalization cohort that are most similar to the target utterance, so that the number of similarity score computations can be significantly reduced. The combination of the NL-Norm normalization methodology and LSH can be trained and evaluated using, for example, the $1^{st}$ Multi-target Speaker Detection and Identification Challenge Evaluation (MCE) 2018 plan, dataset, or baseline system.

In various embodiments comprising NL-Norm and LSH, the system and method can be configured to detect a target (or test) utterance in a speech signal and determine whether the utterance was spoken by one of a large number of NL, also known as "blacklisted", speakers. The system can be configured to apply multi-target speaker detection based on real-world telephone conversations. The system can be configured to analyze data recordings generated from, for example, call center customer-agent conversations and determine if the caller is in the NL.

Applying LSH and NL-Norm, the system and method provides significant improvements in both speed and accuracy over using, for example, PLDA alone. In at least one test implementation of the system, applying LSH and NL-Norm resulted in 88% reduction in detection time while decreasing the equal-error rate (EER) from 6.49% to 5.48% for the MCE 2018 dataset. In at least one test implementation, the system was configured to accurately detect whether a test recording was spoken by an NL speaker.

Much progress has been made in speaker recognition, as demonstrated by continuously improving results in US National Institute of Standards and Technology (NIST) Speaker Recognition Evaluation series. Meanwhile, in real world applications such as call center services, NL detection is often a crucial component of fraud detection based on voice biometrics. In NL detection, a call is flagged for investigation if a target utterance is determined to be spoken by one of the known fraudulent speakers that are enrolled in the NL, without needing to identify which specific NL speaker the caller is matched with.

While state of the art speaker recognition systems focus on the single-target problem, in recent years there have been efforts to develop methods used for multi-target speaker recognition. NL detection includes open-set or multi-target speaker detection.

The MCE 2018 is a challenge designed specifically to promote methods for multi-target cohort detection and multi-target identification. For instance, in the MCE 2018, a Top-S stack detector is used for multi-target cohort detection, with an aim to only detect whether the input speech is spoken by a member of the NL cohort. Meanwhile, a Top-1 stack detector not only detects membership in the NL cohort, but further identifies the specific speaker within the NL.

FIG. 1 shows a block diagram of a communication system 1, constructed according to the principles of the disclosure. The communication system 1 can include at least one call originating (or call destination) communicating device 10, a call center 20, a network 30, and a fraud detection system 40. Alternatively, the fraud detection system 40 can be included in the call center 20. The communicating device 10 and call center 20 each include a communicating device and one or more computer resources. The call center 20 can include one or more communicating (CA) devices 26 operated by, for example, call center agents.

Each of the communicating devices 10 and 26 can be configured to initiate and receive a call (for example, a telephone call) with another communicating device. The communicating devices 10 and 26 can include, for example, a cellular telephone, a tablet, a computer, a Plain Old Telephone Service (POTS) compatible communicating device, a Public Switched Telephone Network (PSTN) compatible communicating device, a voice-over-Internet Protocol (VoIP) compatible communicating device, or any other communicating device configured to initiate or receive a call, including at least an audio signal.

The call can include a call signal comprising audio, video, data, or a computer resource. The call can include audio containing a voice (or speech) signal of the user of the communicating device. The call can include a video signal containing an image of the user of the communicating device. The call can contain a data signal containing, for example, an Automatic Number Identification (ANI), Internet Protocol (IP) address, message (for example, Short Messaging Service (SMS) message, Multimedia Messaging Service (MMS) message), time stamp, location of call origination and destination, call origination number, and call destination number. The computer resource can include instruction signals that can be executed by the receiving communicating device.

The call center 20 can include a plurality of components, including a private automatic branch exchange (PABX) 21, an interactive voice response unit (IVR) 22, an automatic call distribution (ACD) unit 23, a computer telephony integration (CTI) unit 24, a call data platform (CDP) 25, and one or more CA devices 26. The call center 20 can include a bus 27, which can be connected to each component in the call center 20 by a communication link.

The PABX 21 can be configured to connect the components in the call center 20 with a public telephone network.

The IVR 22 can be configured to manage inbound/outbound calls. The IVR 22 can be configured to accept a combination of voice telephone input or touch-tone keypad selection and provide the appropriate responses in the form of voice, callback, email, text, or other communication methodology.

The ACD 23 can be configured to automatically receive incoming calls and distribute the calls to an available CA device 26.

The CTI 24 can be configured to integrate an enterprise communication system (for example, an organization's telephone system) with the components in the call center 20 to facilitate control of the functionalities of the CA devices 26 in accordance with the instant disclosure. The CTI 24 can include, for example, a computer telephony integration (CTI) server.

The CDP 25 can be configured to log, record, and manage call data, including, for example, each call conversation, metadata about each call (incoming and outgoing), caller identity data, and call quality data. The CDP 25 can include, for example, caller (or customer) data server.

The network 30 can include, for example, a cellular network, a public switched telephone network (PSTN), a public land mobile network (PLMN), a local area network (LAN), a wide area network (WAN), or the Internet.

The fraud detection system 40 can be connected to the network 30 over one or more communication links. The fraud detection system 40 can be connected to the communicating device 10 and call center 20 through one or more communication links and the network 30. The fraud detection system 40 can be connected to other communicating devices (not shown) via a communication link, directly or via the network 30.

The fraud detection system 40 can include a communication system 42, a call record (CR) database (DB) 44, and a voice recognition and fraud remediation (VRFR) apparatus 46, each of which can be connected to a bus 48 by a communication link.

The communication system 42 can include one or more modems (not shown) configured for one or more cellular network standards, including, but not limited to, for example, GSM, WiMAX, LTE-TDD/TD-LTE, LTE Advanced (E-UTRA), LTE Advanced Pro, HiperMAN, Mobile WiMAX, Flash-OFDM, iBurst, CDMA2000, HSPA, UMTS, WiDEN, GPRS, CDPD, D-AMPS, NMT, AMPS, or any other modulating/demodulating device that can facilitate transmission of audio (for example, voice), video, or multimedia, including, for example, SMS messages, MMS messages, or the like, over the PSTN, the PLMN, or the like.

In certain embodiments, the communication system 42 can include a file server, a web server, a mail server, a security server (not shown), one or more switching and distribution layers (not shown), one or more routers (not shown), or one or more network switches (not shown), any of which can be interconnected by a communication link. The communication system 42 can include a firewall (not shown) that shields it from cyberattacks.

The communication system 42 can include one or more switching and distribution layers, including a core layer and a distribution layer. The core layer can include one or more layers of switching devices (not shown) that can connect computer resource assets (including, for example, one or more servers) in the communication system 42 to the distribution layer. The distribution layer can include one or more layers of switching devices that can connect the core layer to the one or more routers, the one or more network switches, a communication server, the bus 48, the CR DB 44, or the VRFR apparatus 46. The switching and distribution layers can include one or more routers.

The communication system 42 can be configured to facilitate communication between any of the communicating devices (for example, communicating devices 10, 26) in the communication system 1. The communication system 42 can be configured to facilitate communication between any communicating device or computer resource asset and the fraud detection system 40.

The router(s) can be connected to the network 30 by a communication link. The network 30 can be located on an intranet, behind a firewall, or on the Internet. The router can include a firewall. The network switch can be connected to one or more communicating devices by one or more communication links. The network switch can include one or more ethernet switches (not shown). Data packets can be securely transported between computing devices or communicating devices in the communication system 1.

The communication system 42 can include a standards-based computing system that can operate as a carrier-grade common platform for a wide range of communications applications and facilitate communication over, for example, a public switched telephone network (PSTN) or a public land mobile network (PLMN). The communication system 42 can include Internet message handling services (MHS) that transfer electronic mail messages between communicating devices in the communication system 1. The MHS can include, for example, a message transfer agent or mail transfer agent (MTA), or a mail relay. The communication system 42 can include a message delivery agent (MDA).

The communication system 42 can manage vast amounts of data from a multitude of sources, such as, for example, a plurality of communicating devices 10 (for example, thousands, millions, or more communicating devices), the call center 20, the VRFR apparatus 46, and other computer resource assets in the communication system 1. This data may be received (for example, as streaming data) and stored in the CR DB 44 as raw data. The raw data can be retrieved by one or more data interfaces in the communication system 42, cleaned, transformed, manipulated, processed, compressed, or reduced through analytics.

The data stored in the CR DB 44 can include call and application logs, call detail records (CDRs), CDR events, call conversations, voice recordings, voice prints (or other biometric data), phone prints, call miner data, call quality metrics (such as, for example, Voice Clarity Measurement Enhancement (VCME)), Contextual User Experience (CUE) events, or voiceID data. The CR DB 44 can include partitions, so that partitions can be moved out of the CR DB 44 when they are no longer relevant, thereby allowing for efficient management of the CR DB 44. The CR DB 44 can be configured to communicate with the VRFR apparatus 46 and synchronize records and data therebetween.

The VRFR apparatus 46 can be configured to receive a voice signal from the communicating device 10, analyze at least one discrete portion of the voice signal—a test (or target) utterance—search NL data, compare the test utterance against the NL data (for example, enrolled utterances), and generate a similarity score based on the comparison of the target utterance against the NL records. The target utterance can include, for example, a spoken word, a statement, a vocal sound, or other sound. The VRFR apparatus 46 can be configured to detect and identify a fraudster (or fraudulent call) based on the similarity score and communicate with the call center 20 (for example, a CA device 26) or another communicating device (not shown) concerning the fraudulent call. The communication can include, for example, a fraud alert message, an instruction to terminate the call, or a redirection of the call to another communicating device (not shown), which can include, for example, a communicating device operated by personnel to investigate the call, or law enforcement personnel.

Figure 2:
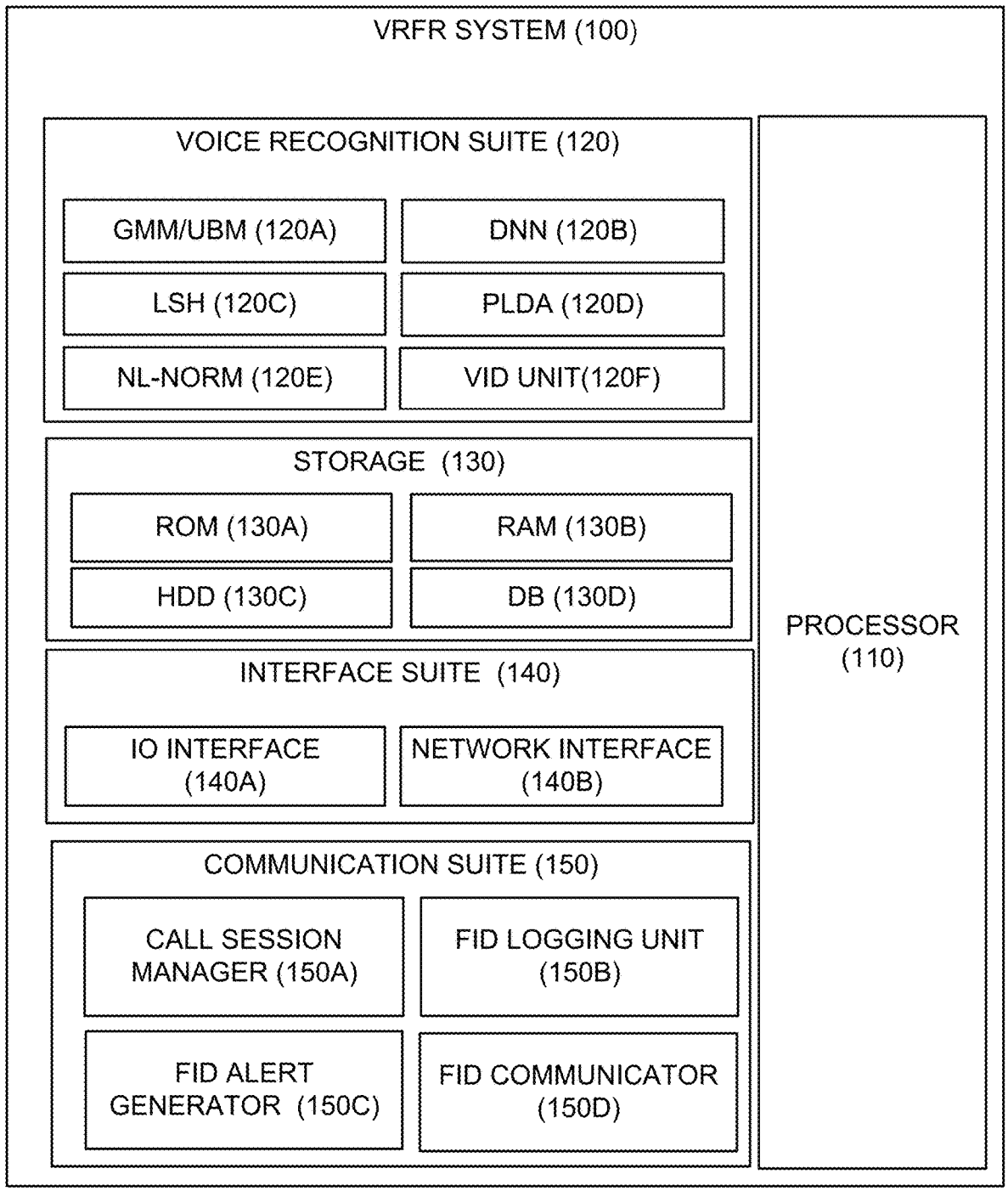
FIG. 2 illustrates a block diagram of a voice biometric recognition and fraud management system, constructed according to the principles of the disclosure.

FIG. 2 shows a block diagram of a voice recognition and fraud remediation (VRFR) system 100, constructed according to the principles of the disclosure. The VRFR system 100 can be included in the VRFR apparatus 46 (shown in FIG. 1). VRFR system 100 can include a processor 110, a voice recognition suite (VRS) 120, a storage 130, an interface suite 140, and a communication suite 150. The VRFR system 100 can include a bus (not shown), which can connect to each of, and facilitate communication and interaction between, any of the computer resource assets (or components) in the VRFR system 100. The bus (not shown) can include any of several types of bus structures that may further interconnect to a memory bus (with or without a memory controller), a peripheral bus, and a local bus using any of a variety of commercially available bus architectures.

The processor 110 can include any of various commercially available processors, multi-core processors, microprocessors or multi-processor architectures.

The VRS 120 can include a processor and a plurality of computer resources that are accessible and executable by the processor 110. In various non-limiting implementations, the computer resource assets in the VRS 120 can be configured to be executable by the processor 110. The computer resources can be stored in and retrieved from, for example, the storage 130.

The VRS 120 can include a plurality of machine learning platforms, including one or more supervised machine learning systems and one or more unsupervised machine learning systems. The VRS 120 can include a Gaussian Mixture Model (GMM) or a GMM with Universal Background Model (GMM/UBM) 120A, a Deep Neural Network (DNN) model 120B, a Locality Sensitive Hashing (LSH) model 120C, a Probabilistic Linear Discriminant Analysis (PLDA) model 120D, a Negative List Normalization (NL-NORM) model 120E, and voice identification unit (VID) 120F. The DNN 120B can include, for example, a Convolutional Neural Network (CNN), a Residual Network (ResNet), or a Time Delay Neural Network (TDNN).

The VRS 120 can include a non-transitory computer-readable storage medium that can hold executable or interpretable computer resources, including computer program code or instructions that, when executed by the processor 110, cause the steps, processes or methods in this disclosure to be carried out. The computer-readable storage medium can be contained in the storage 130.

The GMM/UBM 120A can include a GMM with a UBM. The GMM/UBM 120A can be built and trained to extract i-vector that can be used as or in a voiceprint. A voiceprint can include either i-vector from the GMM/UBM 120A or speaker embedding from DNN 120B.

The GMM/UBM 120A can be configured to facilitate identification of a speaker by classification of a target utterance (or speaker) into one out of n enrolled negative list utterances (or negative list speakers), where n is a positive integer that can be hundreds, thousands, tens of thousands, hundreds of thousands, or more known speakers. The GMM/UBM 120A facilitates utterance (or speaker) identification with high accuracy under clean recording conditions. However, the population n of enrolled utterances (or speakers) is large (for examples, tens of thousands, or more) the amount of computation required to calculate the likelihoods of all n GMMs for a target utterance can be overwhelming.

The DNN 120B can be built and trained to extract speaker embedding (for example, x-vector) which can be used as a voiceprint. In this regard, the DNN 120B can include a TDNN configured to extract the speaker embedding.

The GMM/UBM 120A and DNN 120B can be configured to interact with the PLDA 120D to produce a matching score between a pair of embeddings (for example, i-vectors or x-vectors) representing the log-likelihood ration of the two embeddings belonging to the same speaker.

In various implementations, the PLDA 120D can be located, for example, at a back-end of the VRFR system 100. The GMM/UBM 120A and DNN 120B can be located at a front-end of the system.

The PLDA 120D can be combined with score normalization to create effective backend processing of the speaker recognition suite 120. Once a PLDA score, s(e, t), between a test utterance t and an NL-enrolled utterance e is generated, the normalization techniques in the VRS 120 can be applied for score calibration in order to derive a consistent matching threshold. For NL detection, t can be determined as an NL match if the highest normalized score between t and all NL utterances is above the threshold; this results in a dataset from which the EER metric can be drawn and the accuracy of the model measured.

The LSH 120C can be configured to find a subset of NL speakers and a subset of the normalization cohort that are most similar to a target utterance, so that the similarity scores can be evaluated between the target utterance and these two subsets, which reduces the computation cost at inference time. The advantage of LSH can be further amplified when different adaptive lengths for K are allowed.

LSH 120C can be applied for highly efficient searches over large numbers of records (or databases) of utterances. The LSH 120C can enable quick retrieval of a voice print in large-scale data in conjunction with speaker embeddings while maintaining accuracy. The LSH 120C can be applied to prune or ignore (for example, for sublinear search complexity) speaker embeddings that are unlikely to exceed a predetermined threshold when scored. The LSH 120C can be applied to group vectors into "bins" based on a distance metric operating on the embeddings. When hashed, embeddings that are close to each other in the original space can be mapped into the same bin with high probability. This hashing operation can effectively cluster input data into a large number of very small clusters.

In a non-limiting example of a search use case, the LSH 120C can operate to hash a query vector (or query embedding), determine the bin it hashes to, and compute the distance between the query vector (or query embedding) and all vectors (or embeddings) previously hashed to that bin. The LSH 120C can include hash amplification to increase the number of bins a vector (or embedding) can be hashed to. The amplification can be used to, for example, combine multiple, independent, hash functions drawn from the same family to create a new family with different probability bounds.

The NL-NORM 120E can be configured to consider similarity scores between a normalization cohort and all enrolled NL speakers as a single distribution, which can help to better calibrate test scores and select a consistent threshold for NL detection. Since single-target and multi-target speaker recognitions can share the same techniques, a multi-target speaker recognition problem can be effectively treated as multiple single-target recognitions. However, for call center services, there are often thousands of fraudulent speakers in the NL, which poses some unique challenges: with the increase in the NL size, the detection error as measured by equal error rate (EER) becomes higher, and the computing cost in the form of detection latency for each test grows as well. These challenges can impede an effective real-time NL detection implementation. Accordingly, the NL-NORM 120E can be included (for example, at the back end of the VRS 120) for multi-target applications with, for example, the twin objectives of lowering EER and achieving a faster time for NL detection in the face of an increasing number of speakers in the NL list. The EER is a point on a receiver operating characteristic (ROC) curve where the false acceptance rate equals the fall rejection rate. In general, lower EER maximize the accuracy.

The NL-NORM 120E can be configured to apply NL-specific normalization to improve detection accuracy, take advantage of different adaptive lengths for $S_e$ and $S_t$ (in AS-Norm (Eq. 11)) and NL-normalization, and, via LSH 120E, apply LSH in conjunction with NL-normalization to reduce detection latency at inference time.

The VID 120F can be configured to receive a match score $S_{MATCH}$ and compare the score against a score threshold $S_{THRESHOLD}$. When the match score is calculated to be greater than the score threshold ($S_{MATCH} > S_{THRESHOLD}$), the voice signal can be determined by the VID 120F to match a list of known fraudsters.

The storage 130 can include a read-only memory (ROM) 130A, a random-access memory (RAM) 130B, a hard disk drive (HDD) 130C, and a database (DB) 130D. The storage 130, including computer-readable media, can be configured to provide nonvolatile storage of data, data structures, and computer-executable instructions (or computer program code). The storage 130 can accommodate the storage of any data in a suitable digital format. The storage 130 can include computing resources that can be used to execute aspects of the architecture included in the VRFR system 100, including, for example, a program module, an application program, an application program interface (API), or program data.

In a non-limiting embodiment, the storage 130 can contain computer resources that are executable on the processor 110 to carry out the processes and functions disclosed herein. One or more of the computing resources can be cached in the RAM 130B as executable sections of computer program code or retrievable data.

In various embodiments, the computing resources can include an API such as, for example, a web API, a simple object access protocol (SOAP) API, a remote procedure call (RPC) API, a representation state transfer (REST) API, or any other utility or service p API.

A basic input-output system (BIOS) can be stored in the non-volatile memory in the storage 130, such as, for example, the ROM 130A. The ROM 130A can include, a ROM, an erasable programmable read-only memory (EPROM), or an electrically erasable programmable read-only memory (EEPROM). The BIOS can contain the basic routines that help to transfer information between any one or more of the components in the VRFR system 100 such as during start-up.

The RAM 130B can include a dynamic random-access memory (DRAM), a synchronous dynamic random-access memory (SDRAM), a static random-access memory (SRAM), a non-volatile random-access memory (NVRAM), or another high-speed RAM for caching data.

The HDD 130C can include, for example, an enhanced integrated drive electronics (EIDE) drive, a serial advanced technology attachments (SATA) drive, a solid state drive (SSD), or any suitable hard disk drive for use with big data. The HDD 130C can be configured for external use in a suitable chassis (not shown). The HDD 130C can be arranged to connect to the bus (not shown) via a hard disk drive interface (not shown).

The DB 130D can be arranged to be accessed by any one or more of the components in the VRFR system 100. The DB 130D can be arranged to receive a query and, in response, retrieve specific data, data records or portions of data records based on the query, including negative list entries, which can include an utterance (such as, for example, a sound, a word, a phrase, or a statement). A data record can include, for example, a file or a log. The DB 130D can include a database management system (DBMS) that can interact with the components in the VRFR system 100. The DBMS can include, for example, SQL, NoSQL, MySQL, Oracle, Postgress, Access, or Unix. The DB 130D can include a relational database.

The DB 130D can be configured to synchronize with the CR DB 44 (shown in FIG. 1), including synchronizing negative list records, speaker identification records, call duration, call start and end times, Internet Protocol (IP) addresses, media access control (MAC) addresses, ANIs, or and other call record (CR) data. The DB 130D can be arranged to store historical call data, including queries.

The interface suite 140 can include one or more input-output (IQ) interfaces 140A and one or more network interfaces 140B. The interface suite 140 can be configured to receive, transmit or exchange data and command signals with any communicating device in the communication system 1 (shown in FIG. 1).

The input-output (IO) interface 140A can be arranged to receive instructions or data from an operator. The IO interface 140A can be arranged to receive and transmit speech content, commands or data from (or to) an operator.

The IO interface 140A can be arranged to connect to or communicate with one or more input-output devices, including, for example, a keyboard, a mouse, a pointer, a stylus, a microphone, a speaker, an interactive voice response (IVR) unit, a graphic user interface (GUI), or a display device. The IO interface 140A can include a transmitter, a receiver or a transceiver. Signals, including speech content, can be received from any user device 10 in the communication system 1 via, for example, the IO interface 140A, and commands or data can be forwarded to any communicating device (for example, communicating device 10 or 26) via the IO interface 140A or network interface 140B.

The IO interface 140A can include one or more audio drivers (not shown) and one or more video drivers (not shown). In various embodiments, the audio driver can include a sound card, a sound driver, an interactive voice response (IVR) unit, or any other device necessary to render a sound signal on a sound production device, such as for example, a speaker. The video driver can include a video card, a graphics driver, a video adaptor, or any other device necessary to render an image signal on a display device.

The network interface 140B can be arranged to connect to one or more communicating devices via the network 30, including the communicating devices 10 and call center 20 (shown in FIG. 1). The network interface 140B can be arranged to connect to the Internet or any wired and/or wireless network. The network interface 140B can include a modem, a transmitter, a receiver or a transceiver. The network interface 140B can include a wired or a wireless communication network interface. When used in a local area network (LAN), the network interface 140B can be arranged to include a wired or wireless communication network interface that can connect to the LAN; and, when used in a wide area network (WAN), the network interface 140B can be arranged to include a modem to connect to the WAN network. The modem can be internal or external and wired or wireless. The modem can be connected to the bus via, for example, a serial port interface.

The communication suite 150 can include a call session manager 150A, a fraud identification (FID) logging unit 150B, a FID alert generator 150C, and a FID communicator 150D, which can include one or more transceivers. Each transceiver can include a transmitter and a receiver arranged to transmit and receive communication signals, respectively. The communication signals can be configured for transmission via, for example, voice-over-Internet Protocol (VoIP), public switched telephone network (PSTN), cellular telephone network, or other communication media.

The call session manager 150A can be configured to interact with each communicating device (for example, communicating device 10) in the communication system 1 (shown in FIG. 1). The call session manager 150A can be configured to receive and transmit communication signals from/to any communicating device in the communication system 1. The call session manager 150A can be configured to analyze and log call-specific data for each call originating from a communicating device in the communication system 1, such as, for example, from the communicating devices 10 or 26.

The call session manager 150A can be configured to interact with, for example, the processor 100, the VRS 120, the storage 130, and the FID logging unit 150B such that an utterance in an incoming call can be analyzed, compared against a negative list, a speaker identified (or predicted), and a fraudulent speaker logged.

The FID logging unit 150B can be configured to interact with the VID 120F and, in response to a fraudster determination by the VID 120F, log the identification of the speaker (for example, user of the communicating device 10) and related call data. The FID logging unit 150B can be configured to create, populate, or edit the negative list, which can be contained, for example, in the storage 130.

The FID alert generator 150C can be configured to generate a fraudster alert notification message when an utterance is determined (or predicted) to match an entry in the negative list.

The FID communicator 150D can be configured to send the alert notification message to, for example, the call center 20 or another communicating device (not shown) in the communication system 1. The FID communicator 150D can be configured to packetize and transmit the alert notification message using a communication protocol compatible with the communication platform of the call center 20 or other communicating device (not shown), such as, for example, a communicating device in an enterprise communication system (for example, a communication system of an organization or other entity).

Figure 3:
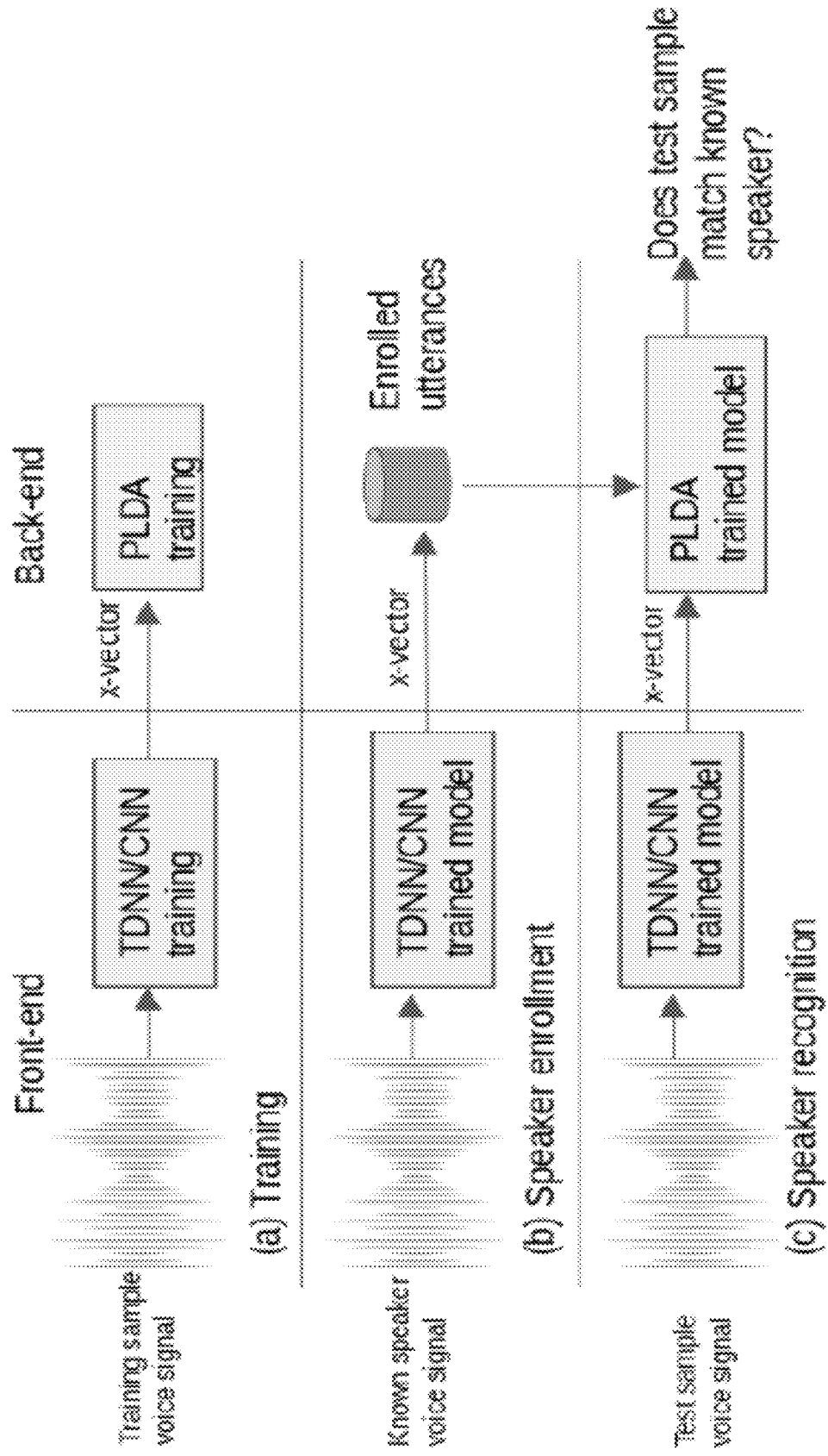
FIG. 3 illustrates non-limiting examples of (a) a training phase, (b) an enrollment phase, and (c) speaker recognition phase of a VRFR system.

FIG. 3 shows non-limiting examples of (a) a training phase, (b) an enrollment phase, and (c) speaker recognition phase of the VRFR system 100. For brevity, FIG. 3 only depicts the TDNN or CNN models, with speaker embedding represented by x-vector as an example.

FIG. 3(a) depicts an example of a training phase in which the DNN 120B is trained to extract the speaker embedding. Although not shown, it is understood that the GMM/UBM 120A can be similarly trained to extract the speaker embedding i-vector. Subsequently, the PLDA 120D can be trained to produce matching score between a pair of i-vectors when the input is from the GMM/UBM 120A, or a pair of speaker embeddings such as x-vectors when the input is from the DNN 120B, for representing the log-likelihood ratio of the two speaker embeddings belonging to the same speaker.

FIG. 3(b) depicts an example of an enrollment phase in which speaker embeddings (for example, x-vectors) are extracted from a known speaker's utterances by the DNN 120B and stored in the database 130D as voice biometric signature of that speaker. Similarly, i-vectors can be extracted from the known speaker's utterances by the GMM/UBM 120A and stored in the dataset 130D as voice biometric signature data for that speaker.

FIG. 3(c) depicts an example of a speaker recognition phase in which an out-of-sample test utterance is presented to the DNN 120B as input. Similarly, an out-of-sample test utterance can be presented to the GMM/UBM 120A. The output speaker embedding (for example, i-vector or x-vector) is paired with the enrolled speaker embedding (for example, i-vector or x-vector) of a known speaker for the PLDA 120D to compute the matching score in order to determine whether the test utterance matches the enrolled speaker. Score normalization can be performed on the PLDA 120D output before it is compared with a predetermined threshold for the match/no-match decision by the VID unit 120F.

All score normalizations require a normalization cohort consisting of utterances from speakers that are neither in NL nor part of the test cohorts. The NL-enrolled utterance set and the normalization cohort can be denoted as $\varepsilon$ and C, respectively:

$$\varepsilon = \{e_i | 1 \leq i \leq E\}$$

$$C = \{c_i | 1 \leq i \leq N\} \quad (1)$$

where E and N are the size of NL and the normalization cohort, respectively, and i is a positive integer greater than or equal to 1.

The scores between an NL speaker utterance e and every utterance $c_i$ can be utilized in the normalization cohort:

$$S_e = \{s(e, c_i) | 1 \leq i \leq N\} \quad (2)$$

Resulting in the normalized score:

$$s(e, t)_{z-norm} = \frac{s(e, t) - \mu(S_e)}{\sigma(S_e)} \quad (3)$$

where $\mu(S_e)$ and $\sigma(S_e)$ are the mean and standard deviation of $S_e$, respectively. For NL detection, Eq. (2) needs to be evaluated for every enrolled speaker e∈ε. However, these evaluations can be carried out during NL enrollment instead of at inference time. At each NL detection, the most computationally expensive task is to calculate E similarity scores $\{s(e_i, t) | 1 \leq i \leq E\}$, which is required regardless of score normalization.

Scores between t and every utterance $c_i$ can be used in the normalization cohort:

$$S_t = \{s(t, c_i) | 1 \leq i \leq N\} \quad (4)$$

resulting in the normalized score:

$$s(e, t)_{t-norm} = \frac{s(e, t) - \mu(S_t)}{\sigma(S_t)} \quad (5)$$

In contrast, Eq. (4) is evaluated at inference time for a given t, therefore there are (N+E) similarity scores to be computed at each NL detection.

AS-Norm, which is often found to have the best performance, especially for multi-target recognitions, is defined as the average of adaptive Z-Norm and T-Norm, namely, for an adaptive length K:

$$s(e, t)_{as-norm} = \frac{1}{2}\left(\frac{s(e, t) - \mu(S_e^{(K)})}{\sigma(S_e^{(K)})} + \frac{s(e, t) - \mu(S_t^{(K)})}{\sigma(S_t^{(K)})}\right) \quad (6)$$

where $S_e^{(K)}$ and $S_t^{(K)}$ denote the subsets consisting of the highest K scores in $S_e$ and $S_t$, respectively. For NL detection, $S_e$ (thus $S_e^{(K)}$ can be evaluated as soon as the NL is constructed, however $S_t$ (thus $S_t^{(K)}$ can only be calculated when the target utterance t is present. Therefore, at inference time for each t the number of similarity scores to be generated is (N+E).

An implementation of the VRS 120 can be tested on the MCE 2018 dataset, a public dataset curated from recordings of customer-agent conversations to an operational call center. The dataset is composed of 26,017 speakers, with 22,386 background speakers and 3,631 speakers on the negative list. The dataset is divided into three parts: train, development, and testing; each part contains background speakers (speakers not on the negative list) and speakers on the negative list. The three data partitions are shown in Table I.

TABLE I

MCE 2018 DATASET DESCRIPTION

| Set | Subset | No. of speakers | Total utterances |
|---|---|---|---|
| Train | Negative list | 3,631 | 10,893 |
|  | Background | 500 | 30,952 |
| Dev. | Negative list | 3,631 | 3,631 |
|  | Background | 5,000 | 5,000 |
| Test | Negative list | 3,631 | 3,631 |
|  | Background | 12,386 | 12,386 |

The MCE 2018 dataset is provided in the form of i-vectors corresponding to each of the negative list and background speaker utterances. Using this dataset has several advantages: NL detection is one of the tasks in MCE challenge; the dataset consists of 600-dimension i-vectors extracted from call center conversations, the domain of interest in an implementation of the disclosure; and the large number of enrolled NL speakers E=3631 is within range of real-world NL sizes. In addition, in an implementation of the VRS 120, part of the speaker recognition backend process, therefore using a set of i-vectors that has been validated by previous studies, eliminated the need for vector extraction, and prevented introducing unnecessary variabilities for the purpose of this implementation.

The PLDA 120D can be a preferred method for similarity score generation due to its accuracy as measured in EER. However, the PLDA 120D by itself is computationally expensive to operate for NL detection as it requires computing a large number of pairwise scores to determine the membership of a test utterance in the NL set. Linear Discriminant Analysis (LDA) can be, optionally, applied prior to the PLDA 120D to reduce dimensions and speed up computation of the score. However, the limiting factor will be the size of the NL. In commercial call-center applications it is not uncommon for the NL to contain thousands of entries, making the PLDA 120D by itself unfeasible for real-time detection.

To speed up the search, the VRS 120 includes the LSH 120C, which can include a family of functions that can solve the nearest neighbor problem by finding approximate—instead of exact—matches. Colloquially, LSH 120C can hash the data and a query point in a way that maximizes the probability of a collision for points that are close to each other than for those which are farther apart. Formally, given a set of points P={$p_1, p_2, \ldots, p_n$} a high-dimensional space $q \in \mathbb{R}^m$, a query point $q \in \mathbb{R}^m$, and distance function d:P×P→ $\mathbb{R}^+$, the LSH 120C finds the point pi that minimizes the distance to the query:

$$\arg\min_{p_i} d(p_i, q)$$
$$\text{s.t.} \quad d(p_i, q) \leq cR$$

In the c-approximate neighbor problem, instead of reporting the point p closest to q, the distance can be allowed to vary no more than c times a fixed radius, R. This approximation allows efficient solutions to exist when the dimensionality, m, is large. The LSH 120C can require $O(mn^{1+1/c})$ processing time and $O(mn^{1/c})$ query time. A crucial parameter in the LSH 120C can be the choice of a distance function. The cosine similarity measure can be approximated well by the LSH 120C.

The LSH 120C can minimize run time at the expense of accuracy, however, the approximate matches retrieved by the LSH 120C have a high probability of being correct as reflected in the lowered EER.

Open-set speaker recognition techniques by the PLDA 120D can be enhanced with score normalization by the NL-NORM 120E. In various embodiments, the NL-NORM 120E can be configured in certain aspects similar to AS-Norm, with at least one important distinction that is unique to NL detection. Instead of normalizing to the score distribution of a single target utterance as Z-Norm, the NL-NORM 120E is configured to construct the normalization distribution using the collection of PLDA scores between the normalization cohort and all enrolled utterances in the NL. In addition, by allowing different adaptive lengths the VRS 120 can take full advantage of the LSH 120C (for example, with the NL-NORM 120E) for optimal speed and accuracy in NL detection.

In applications of the VRS 120, the PLDA 120D can be used effectively by allowing the LSH 120C to constrain the number of PLDA operations required to determine a match from the NL. In other words, the LSH 120C can operate to restrict the PLDA score computations of the PDLA 120D to a small set.

Eq. (3) above is designed to compensate similarity score variations against a single target speaker e, so that scores between e and all utterances can be normalized to the same distribution in order to apply a consistent threshold for speaker verification. For NL detection, since all enrolled speaker utterances are present at testing time, and a single threshold for normalized scores is needed for all speakers in NL, a normalization can be introduced over the entire NL cohort by the NL-NORM 120E. Formally, the scores used by the NL-NORM 120E can include pairwise scores between every normalization cohort member $c_i$ and every NL member $e_j$:

$$S_{NL} = \{S_{e_j} | 1 \leq j \leq E\} \quad (7)$$

Where $S_{e_j}$ is a rewrite of Eq. (2) above:

$$S_{e_j} = \{s(e_j, c_i) | 1 \leq i \leq N\} \quad (8)$$

The NL-NORM 120E can define the NL normalization with an adaptive length K that is analogous to AS-Norm in Eq. (6):

$$s(e, t)_{nl-norm} = \frac{1}{2}\left(\frac{s(e, t) - \mu(S_{NL}^{(K)})}{\sigma(S_{NL}^{(K)})} + \frac{s(e, t) - \mu(S_t^{(K)})}{\sigma(S_t^{(K)})}\right) \quad (9)$$

where $$(S_{NL}^{(K)}) = \{S_{e_j}^{(K)} | 1 \le j \le E\} \quad (10)$$

with $S_{e_j}^{(K)}$ denoting the subset consisting of the highest K scores in $S_{ej}$.

The NL-NORM 120E can be configured to allow different adaptive lengths $K_e$ and $K_t$. This can differ from the adaptive length K used for AS-Norm in Eq. (6). Accordingly, Eq. (6) can be modified as follows:

$$s'(e, t)_{as-norm} = \frac{1}{2}\left(\frac{s(e, t) - \mu(S_e^{(K_e)})}{\sigma(S_e^{(K_e)})} + \frac{s(e, t) - \mu(S_t^{(K_t)})}{\sigma(S_t^{(K_t)})}\right) \quad (11)$$

Similarly, Eq. (9) for NL-NORM 120E can be modified with different adaptive lengths $K_t$ and $K_e$:

$$s(e, t)_{nl-norm} = \frac{1}{2}\left(\frac{s(e, t) - \mu(S_{NL}^{(K_e)})}{\sigma(S_{NL}^{(K_e)})} + \frac{s(e, t) - \mu(S_t^{(K_t)})}{\sigma(S_t^{(K_t)})}\right) \quad (12)$$

The NL-NORM 120E can apply different $K_e$ and $K_t$ to NL detection. By decoupling $K_e$ and $K_t$, not only does it enable further optimization of detection accuracy, but it also allows the selection of a small $K_t$ value without sacrificing the benefit that may require a larger $K_e$. The combination of the LSH 120C with a small $K_t$ can significantly improve the speed of NL detection by reducing the number score computations between the test utterance t and the normalization cohort.

In NL detection, for a given test utterance t, its similarity scores with all members of the NL can be computed and ranked, with or without score normalization. The top ranked score can then be compared with the pre-determined threshold to reach a decision. The search time here will be dominated by O(E), where E=|Σ|.

As discussed above, the LSH 120C can speed up the search process. In this regard, the LSH 120C pipeline can be "trained" on the i-vectors (for example, output from the GMM/UBM 120A; or speaker embeddings (for example, output from the DNN 120B) associated with the Σ and C, where, as noted earlier, C is the normalization cohort. The "training" can be performed by, for example, deriving shorter characteristic embedding for each of the 600-dimension embeddings in Σ and C using a set of random hyperplane-based hash functions. Given a collection of embeddings in $\mathbb{R}^m$, a random embedding $\vec{r}$ from the m-dimension Gaussian distribution can be chosen and a hash function $h_{\vec{r}}$ defined, as follows:

$$h_{\vec{r}}(\vec{u}) = \begin{cases} 1 & \vec{r} \cdot \vec{u} \ge 0 \\ 0 & \vec{r} \cdot \vec{u} < 0 \end{cases} \quad (13)$$

Then, for any embeddings $\vec{u}$ and $\vec{v}$ $$Pr[h_{\vec{r}}(\vec{u}) = h_{\vec{r}}(\vec{v})] = 1 - \frac{\theta(\vec{u}, \vec{v})}{\pi} \quad (14)$$

where $\theta(\vec{u}, \vec{v})$ is the angle between embeddings u and v. It can be estimated that, for n embeddings, the hash functions can be chosen by picking random $O(\log^2 n)$ bits, thereby restricting the random hyperplanes to be in a family size $2^{O(\log^2 n)}$. For a given test i-vector t, the LSH 120C can be applied twice: once to discover $K_e$ nearest neighbors to t from Σ, and the second time to discover $K_t$ nearest neighbors to t from C (for example, the $K_t$ mentioned earlier). Therefore, in Eq. (11) and Eq. (12), $S^{(K_t)}$ can be constructed by identifying $K_t$ members in C using LSH 120C followed by the generation of $K_t$ scores, instead of generating all N scores followed by the identification of top $K_t$ scores. (Recall that N=|C|.) Using such an approach, for each t, the number of PLDA score evaluations by the PLDA 120D can be reduced from O(E+N) to O($K_e+K_t$). Because LSH 120C search time is negligible comparing with PLDA score evaluation, this approach can significantly reduce the computational cost and latency of NL detection.

Figure 4:
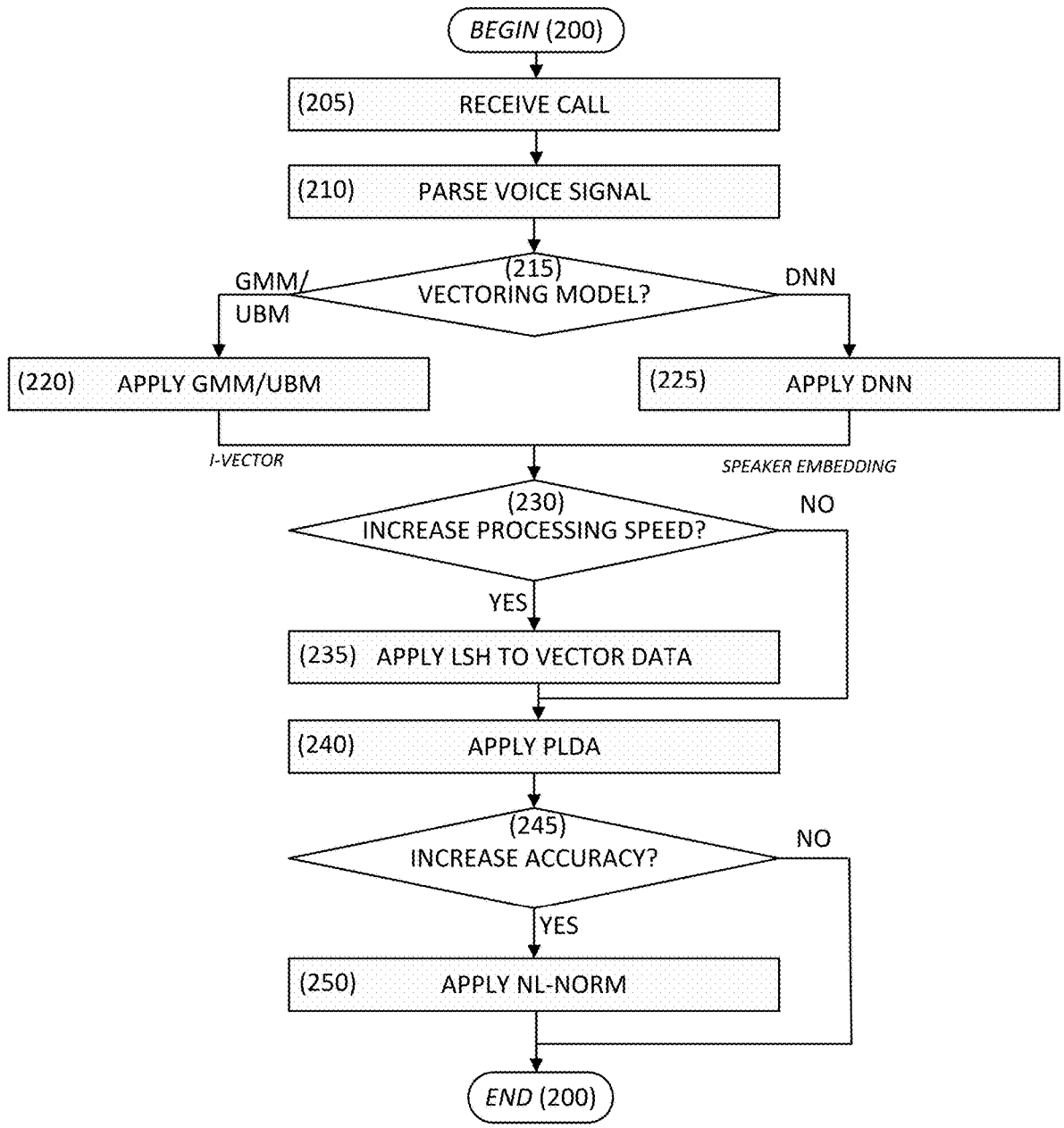
FIG. 4 illustrates a flow diagram of a speaker negative list detection process, according to the principles of the disclosure.

FIG. 4 illustrates a flow diagram of a speaker negative list detection process 200, according to the principles of the disclosure. Referring to FIGS. 1, 2 and 4 contemporaneously, a user of the communicating device 10 can initiate a call to a destination communicating device, such as, for example, a communicating device in the call center 20 or elsewhere in the communication system 1. The call can be received at the fraud detection system 40 (Step 205) and, if the caller is not predicted to be a match in a list of fraudsters, the call can be redirected to the destination communicating device (for example, communicating device 26 in the call center 20).

Alternatively, the call can be received at the call center 20 and bridged to the fraud detection system 40 for simultaneous access to the call signal (Step 205).

The voice signal can be parsed by the processor 110 and one or more utterances forwarded for analysis (Step 210). A determination can be made whether to apply speaker embedding (for example, i-vector or x-vector) analysis (Step 215). If it is determined to apply i-vector analysis, the voice data can be forwarded to the GMM/UBM 120A and the GMM/UBM model can be applied to the data to provide i-vector data (Step 215, then Step 220). If it is determined to apply speaker embedding (for example, x-vector) analysis, the voice data can be forwarded to the DNN 120B and a DNN model can be applied to the data to provide x-vector data (Step 215, then Step 225).

A determination can be made whether to increase processing speed with respect to the output from the GMM/UBM 120A or the DNN 120B, before applying the speaker embedding (for example, i-vector or x-vector) data to the PLDA 120D (Step 230). If a determination is made to increase processing speed (YES at Step 230), then the output from the GMM/UBM 120A or the DNN 120B can be input to and the LSH 120C applied to reduce processing (Step 235) and the output of the LSH 120C input to and the PLDA 120D applied for scoring (Step 240).

If a determination is made not to increase processing speed prior to applying PLDA (NO at Step 230), then the output from the GMM/UBM 120A or the DNN 120B can be input to and the PLDA 120D applied for scoring (Step 240).

A determination can be made whether to increase accuracy to the scoring data output by the PLDA 120D (Step 245). If it is determined to increase accuracy (YES at Step 245), then the output of the PLDA 120 can be input to and the NL-NORM 120E can be applied (Step 250). However, if it is determined not to increase accuracy (NO at Step 245), then the output of the PLDA 120 can be forwarded to the input to and the VID 120F and the process ended.

Figure 5:
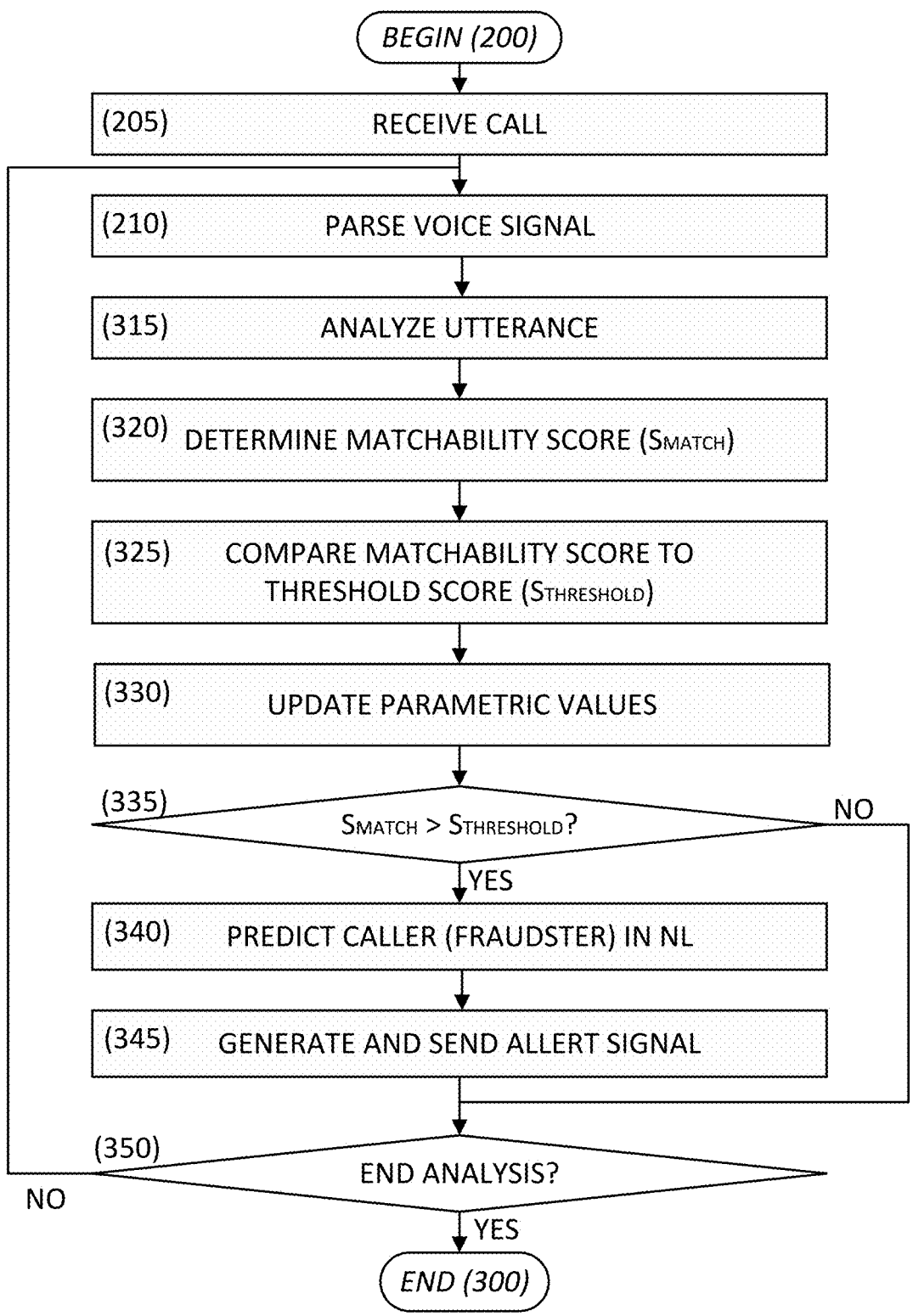
FIG. 5 illustrates a flow diagram of a fraud detection and remediation process, according to the principles of the disclosure.

FIG. 5 illustrates a flow diagram of a fraud detection and remediation process 300, according to the principles of the disclosure. Referring to FIGS. 1, 2 and 5 contemporaneously, after the user of the communicating device 10 initiates the call to the destination communicating device and the call is received (Step 205) and parsed (Step 210), for example, in the VRFR system 100, an utterance in the voice signal can be analyzed by the VRS 120 for purposes of identifying the speaker against an NL, for example, stored in the DB 130D (Step 315). The analysis can include Steps 215 through 235 of the voice identification process 200 (shown in FIG. 4).

Based on the analysis of the test utterance against the NL, a matchability score $S_{MATCH}$ can be determined (Step 320). The score can be determined, for example, by the NL-NORM 120E. The matchability score $S_{MATCH}$ can be compared against a predetermined threshold score $S_{THRESHOLD}$ (Step 325) and the parametric values of the models in VRS 120 can be updated to tune the models (Step 330). If it is determined that the matchability score $S_{MATCH}$ is greater than the threshold score $S_{THRESHOLD}$ (YES at Step 335), then the utterance can be determined (or predicted), for example, by the VID 120F to belong to a known caller (or fraudster) in the negative list (Step 340), otherwise (NO at Step 335) a determination can be made whether to end analysis (Step 350). The determination can include an identity of the fraudster.

After determining the utterance with high probability matches a set of fraudsters (Step 340), a notification signal can be generated by the FID alert generator 150C and sent by the FID communicator 150D (Step 345), and a determination can be made whether to end analysis (Step 350). The notification signal can be sent to, for example, a call agent communicating device 26 or another communicating device (not shown) to investigate the call, terminate the call, or take other appropriate logging or remediation steps.

If a determination is made not to end the analysis (NO at Step 350), the process 300 can be repeated for the next utterance in the call, otherwise (YES at Step 350) the process can be ended.

Before receiving the call from the communicating device 10, the machine learning models in the VRS 120 can be trained. For example, the GMM/UBM 120A and DNN 120 models can be trained using voice recordings with speaker labels. According to a non-limiting approach, an MCE dataset consisting of 3,631 NL speakers and 5,000 background (non-NL) speakers can be used as a training dataset to train, for example, the PLDA 120D. The MCE dataset includes three utterances from each NL speaker, and the mean of the three i-vectors are enrolled in NL as the utterance of the corresponding fraudster—that is, an enrolled NL utterance. A normalization cohort of 4,000 augmented i-vectors is generated by applying at random a weighted sum between non-NL speaker i-vectors and NL speaker i-vectors, limiting the maximum weight for NL speakers to 20%. The development set, consisting of one utterance from each of the 3,631 NL speakers and non-NL speakers, is used to verify the baseline approach of the PLDA model 120E with the AS-Norm model (in the NL-NORM 120E), including the tuning of adaptive length K in AS-Norm for baseline EER computation on the test dataset.

It is noted that a similar approach, as described herein for i-vectors from the GMM/UBM 120A can also be applied for speaker embeddings (for example, x-vectors) from the DNN 120B.

A stratified 50/50 random split of the MCE test dataset, consisting of one utterance from each of the 3,631 NL speakers and 12,386 non-NL speakers, produces an equal-sized validation dataset and evaluation dataset. The validation dataset is used for tuning of hyper-parameters in the LSH 120C, including LSH depth L, and the adaptive length K in the NL-NORM 120E (for example, according to Eq. (9)), as well as the $K_t$ and $K_e$ (for example, according to Eqs. (11) and (12)). The evaluation dataset is reserved for holdout testing only. Unless specified otherwise, all results presented in this disclosure can be obtained using the evaluation dataset. A motivation for generating the validation and evaluation datasets from the MCE test dataset is that the 50/50 stratified split preserves the ratio of non-NL to NL speakers of the test dataset, which is significantly higher than that of the development dataset. In most real-world call center applications, this ratio is much higher. In addition, it is desirable that the validation and evaluation datasets have similar distributions and behaviors, whereas the MCE development dataset exhibits much lower EER than the test dataset.

In maximizing the effectiveness of the novel NL detection methods disclosed herein, a minimal baseline approach can be adopted—for example, by the PLDA 120D followed by the NL-NORM 120E, in order to remove potential variations introduced by nonessential steps. For example, in the instant disclosure, although optional, an LDA is unnecessary and, therefore eliminated even though it is often used in state-of-the art systems prior to PLDA for dimension reduction. With this baseline, the NL detection EER of the VRS 120 was observed to be 1.25% and 5.66% for the MCE development and the entire test datasets, respectively.

In the VRS 120, the LSH 120C can be applied prior to the PLDA 120D to reduce the number of similarity score computations. For example, the NearPy Python framework2 can be used in an implementation of the LSH 120C with random hyperplane-based hash functions.

Referring to the NL-NORM 120E, the resulting EER of NL detection is 5.57%, reduced from 5.69% for AS-Norm (for example, according to Eq. (9)). To verify the stability and consistency of this result, a cross validation is performed by repeating 10 times the stratified random 50/50 split of the MCE test dataset into the validation and evaluation datasets. The outcome is shown in Table II below, where an average of 0.11% reduction in EER absolute value is observed.

TABLE II

| (NL-Norm vs. AS-Norm EER) | | | |
|---|---|---|---|
| | | AS-Norm | NL-Norm |
| EER (Evaluation Set) | | 5.69% | 5.57% |
| EER (Cross Validation) | mean | 5.64% | 5.53% |
| | std | 0.26% | 0.28% |

Comparing AS-Norm of Eq. (11) with Eq. (6), with the additional tuning parameter, a lower EER can be reached by the NL-NORM 120E when separate adaptive lengths $K_e$ and $K_t$ are employed. Table III shows the tuning progress on the validation dataset, where the first row represents the AS-Norm that requires $K_e = K_t$, and the second row represents the best result found with $K_e$=1600 and $K_t$=600. In addition to the gain in accuracy, importantly, this approach offers the flexibility of selecting a low $K_t$ value that yields a close-to-optimal EER, as demonstrated by the last row of Table III, where $K_t$=200. A low $K_t$, combined with LSH, enables a significant reduction in the number of score computations between the test utterance t and the normalization cohort, which in turn increases the NL detection speed.

TABLE III (Tuning AS-Norm with Different Adaptive Lengths)

| $K_e$ | $K_t$ | EER (%) |
|---|---|---|
| 300 | 300 | 5.69 |
| 1600 | 600 | 5.61 |
| 3800 | 200 | 5.62 |

Referring to the LSH 120C, a test vector, t, can be compared against a NL of size E=3,631. As Table IV shows, the fastest distance algorithm for comparison is cosine distance, which takes 4 ms to compare t against all of the NL entries. However, its speed is achieved at the cost of accuracy: the cosine distance yields an EER of 7.40%. The PLDA 120D improves on the EER but at the expense of an increased latency. The LSH 120C followed by the PLDA 120D allows the VRS 120, not only to derive an EER similar to that of the PLDA 120D only, but it also does so at a fraction of time: 28 ms compared to 864 ms for the PLDA 120D. For the test vector t, the LSH 120C can first conduct a search to find L members of NL that are most similar to t, then the PLDA 120D can compute the score between t and these L utterances, with the highest score selected for EER calculation.

TABLE IV (Accuracy and Latency)

| Algorithm | EER (%) | Time (ms) |
|---|---|---|
| Cosine distance | 7.40 | 4 |
| PLDA | 6.49 | 864 |
| LSH + PLDA (L = 30) | 6.46 | 28 |

Figure 6:
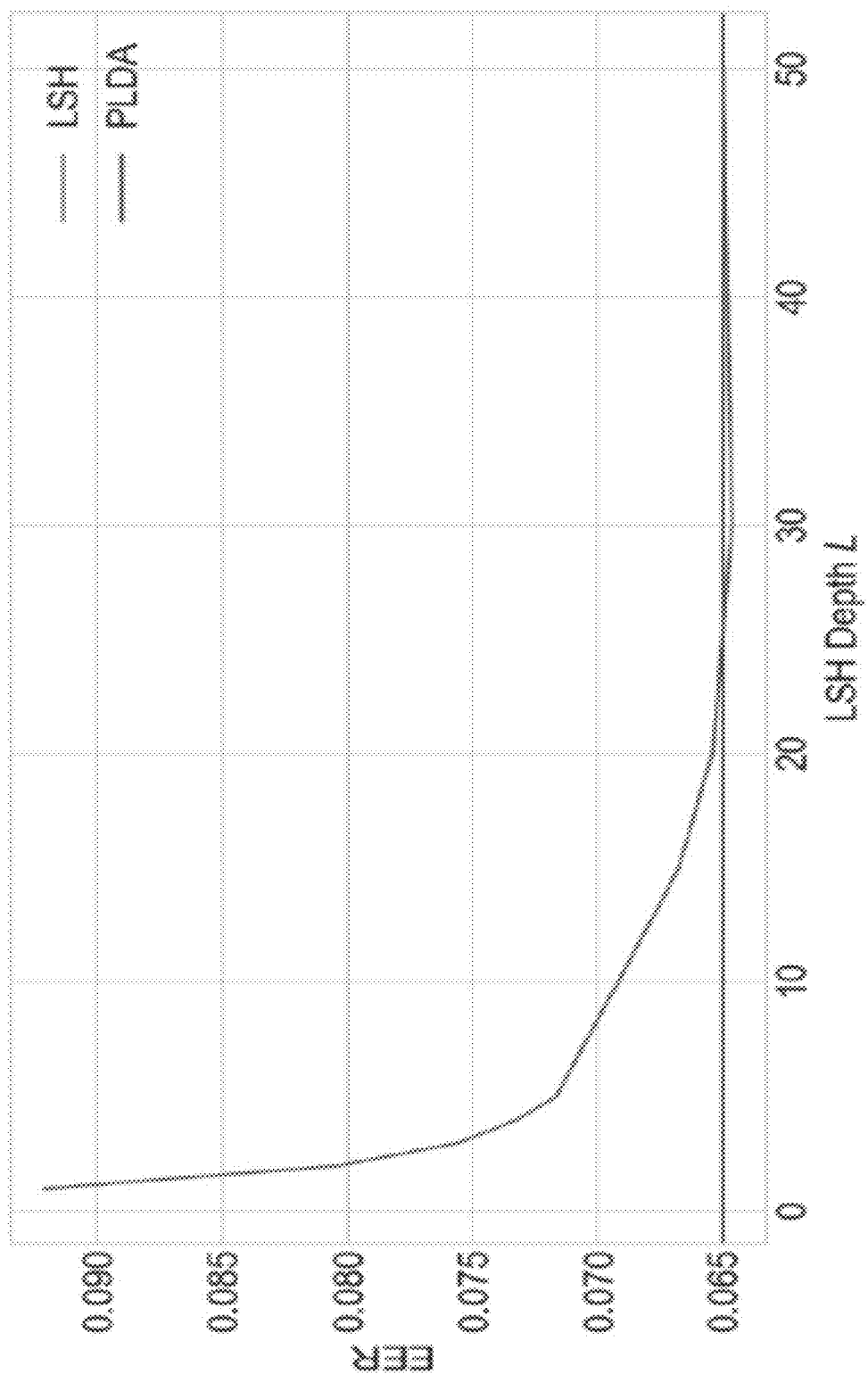
FIG. 6 illustrates a chart that demonstrates empirically an example of LSH depth versus EER, according to the principles of the disclosure.

FIG. 6 illustrates a chart that demonstrates empirically an example of where, as the depth L of the LSH 120C increases, the resulting EER can approach the EER exhibited by the PLDA 120D if a greedy score calculation strategy is used across the entire NL. In the chart, the relatively flat line represents the EER obtained from PLDA 120D (without score normalization), and the curved line represents the EER obtained from the LSH 120C. For the NL dataset with size E=3,631, an LSH depth L=30 is sufficient to match the EER of PLDA alone.

In FIG. 6, even though EER=6.46% at L=30, which is slightly better than the EER of 6.49% without the LSH 120C, it is not necessarily an indication that the LSH 120C can help improve NL detection accuracy. A reason for the occasionally lower EER when performing the LSH 120C first is that for a test utterance not spoken by any NL speaker, the LSH 120C may fail to find the NL member that would have produced the highest PLDA score, thus eliminating a false-match instance from the EER evaluation. As seen in FIG. 6, this effect quickly disappears with increasing LSH depth L. The results in FIG. are obtained without score normalization. Score normalization improves EER, we next discuss the effect of combining the LSH 120C and the PLDA 120D, and score normalization next.

FIG. 7 illustrates an example of a methodology flow that can be performed by applying both LSH 120C and NL-NORM 120E. For instance, the process in lines 1-12 establishes the normalization over the entire NL cohort as discussed earlier. This step may be done only once, during initialization. Each enrolled speaker's utterances are scored against all of the normalization cohorts and the top $K_e$ matches for that speaker and the normalization cohort are saved (line 10). At the end of the loop on line 11, $S_{NL}^{(K_e)}$ is populated and will be used to compute the NL-Norm later. As part of the populating $S_{NL}^{(K_e)}$ it is possible that the eventual top-ranked NL speaker which induces the highest normalized PLDA score is not among the top $K_e$ NL members identified by the LSH search, resulting in a decrease in the NL detection accuracy. This deficiency can be mitigated by expanding LSH search depth $K_e$. At line 12, the NL-Norm computation function can be invoked, which returns true if a match is found.

For a given target vector t, first the top-L nearest neighbors of t from the NL E (line 14) can be found. To apply normalization, PLDA scores between t and utterances in the normalization cohort C are also needed; LSH can be utilized once more to find $K_t$ utterances in C that are most similar to t (line 15). By the end of the loop on line 19, both the sets $S_t^{(K_t)}$ and $S_{NL}^{(K_e)}$ are available, the latter populating during initialization as described in the preceding paragraph. Finally, lines 21-25 compute the normalized PLDA score between t and each NL list member, saving the results in a list (Line 25) that is checked against the threshold to determine an NL match. With methodology of FIG. 6, the total number of PLDA evaluations are reduced from O(E+N) without LSH to O(L+$K_t$) with LSH, where L<<E and $K_t$<<N.

Table V lists the results obtained using various approaches, including the NL detection time per test utterance along with parameters L, $K_e$ and $K_t$ which, as described earlier, can be selected via a grid search for the lowest EER on the validation dataset, then applied to the evaluation dataset. As earlier, if multiple {$K_e$, $K_t$} pairs yield near-lowest EERs for the validation dataset, then the one with a low $K_t$ is selected to take full advantage of LSH.

TABLE V (EER and NL Detection Time (Per Test Utterance))

| Method | EER (%) | L | $K_e$ | $K_t$ | Time (ms) |
|---|---|---|---|---|---|
| PLDA, no score norm | 6.49 | — | — | — | 864 |
| AS-Norm (Eq. (6)) | 5.69 | — | 300 | 300 | 1975 |
| NL-Norm (Eq. (9)) | 5.57 | — | 500 | 500 | 1981 |
| AS-Norm (Eq. (11)) | 5.52 | — | 3800 | 200 | 2051 |
| NL-Norm (Eq. (12)) | 5.57 | — | 400 | 500 | 1976 |
| LSH + PLDA, no score norm | 6.46 | 30 | — | — | 28 |
| LSH + AS-Norm (Eq. (11)) | 5.66 | 50 | 2000 | 250 | 114 |
| LSH + NL-Norm (Eq. (12)) | 5.48 | 50 | 3700 | 200 | 102 |

The first two rows in Table V are results of the baseline model, with and without score normalization. By applying LSH without score normalization, the NL detection time per test utterance is reduced from 864 ms to 28 ms, with little change in EER. When adopting Eq. (12) for score normalization, EER is lowered to 5.48% by taking advantage of NL-Norm and allowing different adaptive lengths $K_t$ and $K_e$, at the same time the NL detection time is shortened significantly from 1975 ms to 102 ms, a beneficiary of LSH search. As noted previously, these results are obtained using the 600-dimension i-vector as input to PLDA model directly. A dimension reduction step such as LDA can be, optionally, inserted before the PLDA 120D to reduce the inference time further for all approaches listed in Table V, with or without LSH search. Nonetheless the LSH results presented here demonstrate that real-time NL detection is effective for applications such as call center services.

Negative list detection is an important application that can be used for fraud detection in various industries such as call center services. The instant disclosure provides novel techniques specifically devised for NL detection, with the aim of improving both accuracy and speed. NL-Norm considers similarity scores between the normalization cohort and all enrolled NL speakers as a single distribution, which helps calibrate test scores and select a consistent threshold over the entire NL. LSH is applied to find NL speakers as well as utterances in the normalization cohort that are most similar to a test utterance, so that PLDA scoring is performed only on small subsets of utterances, which significantly lowers the computation cost and latency of the NL detection. The effectiveness of LSH is further amplified when different adaptive lengths for Z-Norm and T-Norm terms are allowed in AS-Norm and NL-Norm, so that evaluating a relatively small number of similarity scores between a test utterance and the normalization cohort is sufficient t reach optimal accuracy.

The terms "a," "an," and "the," as used in this disclosure, means "one or more," unless expressly specified otherwise.

The term "backbone," as used in this disclosure, means a transmission medium or infrastructure that interconnects one or more computing devices or communication devices to provide a path that conveys data packets and instruction signals between the one or more computing devices or communication devices. The backbone can include a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The terms "communicating device" or "communication device," as used in this disclosure, mean any computing device, hardware, or computing resource that can transmit or receive data packets, instruction signals or data signals over a communication link. The communicating device or communication device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G or 5G cellular standards, satellite, or Bluetooth. A communication link can include, for example, an RS-232, RS-422, RS-485, or any other suitable interface.

The terms "computer," "computing device," or "processor," as used in this disclosure, means any machine, device, circuit, component, or module, or any system of machines, devices, circuits, components, or modules that are capable of manipulating data according to one or more instructions.

The terms "computer," "computing device" or "processor" can include, for example, without limitation, a processor, a microprocessor (µC), a central processing unit (CPU), a graphic processing unit (GPU), a data processing unit (DPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, µCs, CPUs, GPUs, ASICs, general purpose computers, super computers, personal computers, laptop computers, palmtop computers, notebook computers, desktop computers, workstation computers, or servers.

The terms "computer resource asset" or "computing resource asset," as used in this disclosure, means a computing resource, a computing device or a communicating device, or any combination thereof.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The terms "computer resource" or "computing resource," as used in this disclosure, mean software, a software application, a web application, a web page, a computer application, a computer program, computer code, machine executable instructions, firmware, or a process that can be arranged to execute on a computing device or a communicating device.

The terms "computer resource process" or "computing resource process," as used in this disclosure, mean a computing resource that is in execution or in a state of being executed on an operating system of a computing device, such as, for example, the NLP 110 or the MP 120 (shown in FIG. 2). Each computing resource that is created, opened, or executed on or by the operating system can create a corresponding computing resource process. A computing resource process can include one or more threads, as will be understood by those skilled in the art.

The term "database," as used in this disclosure, means any combination of software or hardware, including at least one computing resource or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, a computing resource such as, for example, an application program that can accept connections to service requests from communicating devices by sending back responses to the devices. The database can be configured to run the at least one computing resource, often under heavy workloads, unattended, for extended periods of time with minimal or no human direction.

The terms "including," "comprising" and variations thereof, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by sending back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

The terms "transmission," "transmit," or "send," as used in this disclosure, mean the conveyance of data, data packets, computer instructions, or any other digital or analog information via electricity, acoustic waves, light waves or other electromagnetic emissions, such as those generated with communications in the radio frequency (RF) or infrared (IR) spectra. Transmission media for such transmissions can include air, coaxial cables, copper wire, or fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer-implemented method for recognizing a user of a communicating device as belonging to a list of known users from an utterance included in a voice signal received from the communicating device, the method comprising:

applying an utterance of a speaker to a machine learning voiceprint extraction model to extract a voiceprint set comprising an i-vector or a speaker embedding based on the utterance;

outputting the voiceprint set by the machine learning voiceprint extraction model;

applying the output voiceprint set to a machine learning model to compute an utterance match score based on the voiceprint set, or to a machine learning hashing model to reduce the voiceprint set to a reduced dimension voiceprint set and apply the reduced dimension voiceprint set to the machine learning model to compute the utterance match score based on the reduced dimension voiceprint set;

outputting the utterance match score by the machine learning model;

applying the output match score to a machine learning score normalization model (NL-NORM) to calibrate the match score;

comparing the calibrated match score to a match score threshold; and, when the calibrated match score is greater than the match score threshold, identifying the user as belonging to a list of known users.

2. The computer-implemented method in claim 1, wherein the machine learning vector extraction model comprises a Gaussian Mixture Model (GMM) or a Gaussian Mixture Model with Universal Background Model (GMM-UBM) that extracts the i-vector.

3. The computer-implemented method in claim 1, wherein the machine learning hashing model comprises a Locality Sensing Hashing model (LSH).

4. The computer-implemented method in claim 1, wherein the machine learning hashing model is configured to find a subset of negative list speakers and a subset of a normalization cohort that are most similar to the utterance, such that a similarity score is evaluated between the utterance and the subset of negative list speakers and the subset of the normalization cohort to reduce computation by a processor at inference time.

5. The computer-implemented method in claim 1, wherein the machine learning score normalization model (NL-NORM) is configured to analyze similarity scores between a normalization cohort and all enrolled negative list speakers as a single distribution to calibrate the match score.

6. The computer-implemented method in claim 1, wherein the machine learning voiceprint extraction model comprises a Deep Neural Network model (DNN) that extracts the speaker embedding.

7. The computer-implemented method in claim 6, wherein the DNN comprises a Convolutional Neural Network (CNN), a Residual Network (ResNet), a Time Delay Neural Network (TDNN), or a machine learning model architecture configured for speaker recognition.

8. An apparatus for recognizing a user of a communicating device as belonging to a list of known users from an utterance included in a voice signal received from the communicating device, the apparatus comprising:
   one or more processors;
   an input device;
   an output device; and
   a memory storing one or more programs to be executed by the one or more processors, the one or more programs comprising instructions for:
   applying an utterance of a speaker to a machine learning voiceprint extraction model to extract a voiceprint set comprising an i-vector or a speaker embedding based on the utterance;
   outputting the voiceprint set by the machine learning voiceprint extraction model;
   applying the output voiceprint set to a machine learning model to compute an utterance match score based on the voiceprint set, or to a machine learning hashing model to reduce the voiceprint set to a reduced dimension voiceprint set and apply the reduced dimension voiceprint set to the machine learning model to compute the utterance match score based on the reduced dimension voiceprint set;
   outputting the utterance match score by the machine learning model;
   applying the output match score to a machine learning score normalization model (NL-NORM) to calibrate the match score;
   comparing the calibrated match score to a match score threshold; and,
   when the calibrated match score is greater than the match score threshold, identifying the user as belonging to a list of known users.

9. The apparatus in claim 8, wherein the machine learning vector extraction model comprises a Gaussian Mixture Model (GMM) or a Gaussian Mixture Model with Universal Background Model (GMM-UBM) that extracts the i-vector.

10. The apparatus in claim 8, wherein the machine learning hashing model comprises a Locality Sensing Hashing model (LSH).

11. The apparatus in claim 8, wherein the machine learning hashing model is configured to find a subset of negative list speakers and a subset of a normalization cohort that are most similar to the utterance, such that a similarity score is evaluated between the utterance and the subset of negative list speakers and the subset of the normalization cohort to reduce computation by a processor at inference time.

12. The apparatus in claim 8, wherein the machine learning score normalization model (NL-NORM) is configured to analyze similarity scores between a normalization cohort and all enrolled negative list speakers as a single distribution to calibrate the match score.

13. The apparatus in claim 8, wherein the machine learning voiceprint extraction model comprises a Deep Neural Network model (DNN) that extracts the speaker embedding.

14. The apparatus in claim 13, wherein the DNN comprises a Convolutional Neural Network (CNN), a Residual Network (ResNet), a Time Delay Neural Network (TDNN), or a machine learning model architecture configured for speaker recognition.

15. A non-transitory computer readable storage medium storing one or more programs, the one or more programs comprising instructions, which, when executed by an apparatus device with one or more processors, one or more input devices, and one or more output devices, cause the apparatus to perform operations for recognizing a user of a communicating device as belonging to a list of known users from an utterance included in a voice signal received from the communicating device, the operations comprising:
   applying an utterance of a speaker to a machine learning voiceprint extraction model to extract a voiceprint set comprising an i-vector or a speaker embedding based on the utterance;
   outputting the voiceprint set by the machine learning voiceprint extraction model;
   applying the output voiceprint set to a machine learning model to compute an utterance match score based on the voiceprint set, or to a machine learning hashing model to reduce the voiceprint set to a reduced dimension voiceprint set and apply the reduced dimension voiceprint set to the machine learning model to compute the utterance match score based on the reduced dimension voiceprint set;
   outputting the utterance match score by the machine learning model;
   applying the output match score to a machine learning score normalization model (NL-NORM) to calibrate the match score;
   comparing the calibrated match score to a match score threshold; and,
   when the calibrated match score is greater than the match score threshold, identifying the user as belonging to a list of known users.

16. The non-transitory computer readable storage medium in claim 15, wherein the machine learning vector extraction model comprises a Gaussian Mixture Model (GMM) or a Gaussian Mixture Model with Universal Background Model (GMM-UBM) that extracts the i-vector.

17. The non-transitory computer readable storage medium in claim 15, wherein the machine learning hashing model comprises a Locality Sensing Hashing model (LSH) configured to find a subset of negative list speakers and a subset of a normalization cohort that are most similar to the utterance, such that a similarity score is evaluated between the utterance and the subset of negative list speakers and the subset of the normalization cohort to reduce computation by a processor at inference time.

18. The non-transitory computer readable storage medium in claim 15, wherein the machine learning score normalization model (NL-NORM) is configured to analyze similarity scores between a normalization cohort and all enrolled negative list speakers as a single distribution to calibrate the match score.

19. The non-transitory computer readable storage medium in claim 15, wherein the machine learning voiceprint extraction model comprises a Deep Neural Network model (DNN) that extracts the speaker embedding.

20. The apparatus in claim 19, wherein the DNN comprises a Convolutional Neural Network (CNN), a Residual Network (ResNet), a Time Delay Neural Network (TDNN), or a machine learning model architecture configured for speaker recognition.

* * * * *